United States Patent
Yoshino et al.

(10) Patent No.: US 6,685,280 B1
(45) Date of Patent: Feb. 3, 2004

(54) VEHICLE BRAKING SYSTEM AND VEHICLE BRAKING DEVICE

(75) Inventors: Masato Yoshino, Itami (JP); Hideaki Higashimura, Itami (JP); Makoto Nishikimi, Itami (JP); Keita Nakano, Itami (JP); Yoichi Miyawaki, Itami (JP)

(73) Assignee: Sumitomo Electric Industries, Ltd., Hyogo (JP)

( * ) Notice: Subject to any disclaimer, the term of this patent is extended or adjusted under 35 U.S.C. 154(b) by 0 days.

(21) Appl. No.: 09/868,633

(22) PCT Filed: Oct. 27, 2000

(86) PCT No.: PCT/JP00/07553
§ 371 (c)(1),
(2), (4) Date: Sep. 10, 2001

(87) PCT Pub. No.: WO01/30627
PCT Pub. Date: May 3, 2001

(30) Foreign Application Priority Data

Oct. 27, 1999 (JP) .............................................. 11-305352

(51) Int. Cl.$^7$ ................................................ B60T 8/36
(52) U.S. Cl. ................................................ 303/119.2
(58) Field of Search ............................ 303/3, 9.63, 15, 303/122.04, 119.1, 119.2

(56) References Cited

U.S. PATENT DOCUMENTS

| | | | |
|---|---|---|---|
| 4,708,404 A | 11/1987 | Seibert et al. | |
| 4,919,493 A | 4/1990 | Leiber | |
| 5,248,191 A | * 9/1993 | Kondo et al. | 303/117.1 |
| 5,302,008 A | * 4/1994 | Miyake et al. | 303/14 |
| 5,462,343 A | 10/1995 | Yoshida et al. | |
| 5,658,057 A | * 8/1997 | Ohnuma et al. | 303/119.2 |
| 5,878,573 A | 3/1999 | Kobayashi et al. | |
| 6,086,165 A | 7/2000 | Fujioka et al. | |
| 6,126,248 A | * 10/2000 | Kawahata et al. | 303/114.1 |
| 6,247,765 B1 | 6/2001 | Oyama | |

FOREIGN PATENT DOCUMENTS

| | | |
|---|---|---|
| DE | 3502018 | 7/1986 |
| JP | 7-81547 | 3/1995 |
| JP | 7-137627 | 5/1995 |
| JP | 9-164941 | 6/1997 |
| JP | 9-226567 | 9/1997 |
| JP | 10-35455 | 2/1998 |
| JP | 10-86802 | 4/1998 |
| JP | 00326839 | 11/2000 |

* cited by examiner

Primary Examiner—Jack Lavinder
Assistant Examiner—Xuan Lan Nguyen
(74) Attorney, Agent, or Firm—Greenblum & Bernstein, P.L.C.

(57) ABSTRACT

This invention is to provide a brake system and a brake device for use of automobiles, in which a braking energy stored in an auxiliary pressure source can be exploited effectively for a braking purpose, even if an electrical system fails. In particular, the vehicle brake system includes a proportional pressure control valve 80 for generating braking liquid pressure by adjusting the braking energy stored in the auxiliary pressure source 30. Also the vehicle brake system comprises a passage 75 transmitting the liquid pressure generated by a stroke of a brake pedal 1, a switching valve 76 opening the passage in the powered condition and closing the same in the off-powered condition, and an auxiliary control portion 81 activating the proportional pressure control valve 80. Even in the off-powered condition, the high pressure accumulated in the auxiliary pressure source 30 can be used to adjust the required braking liquid pressure at the proportional pressure control valve 80. The switching valve 76 cane be replaces with a relief valve 116 and a return valve 117 for activating the proportional pressure control valve 80 so as to effectively utilize the high pressure of the auxiliary pressure source 30 even in the on-powered condition.

9 Claims, 13 Drawing Sheets

Fig. 7
(a)
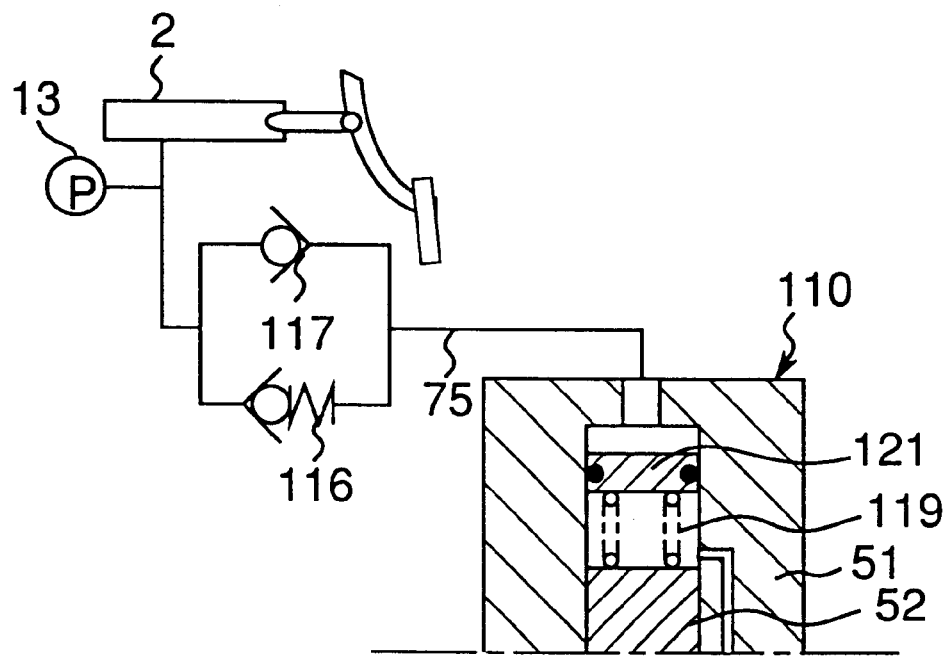
(b)
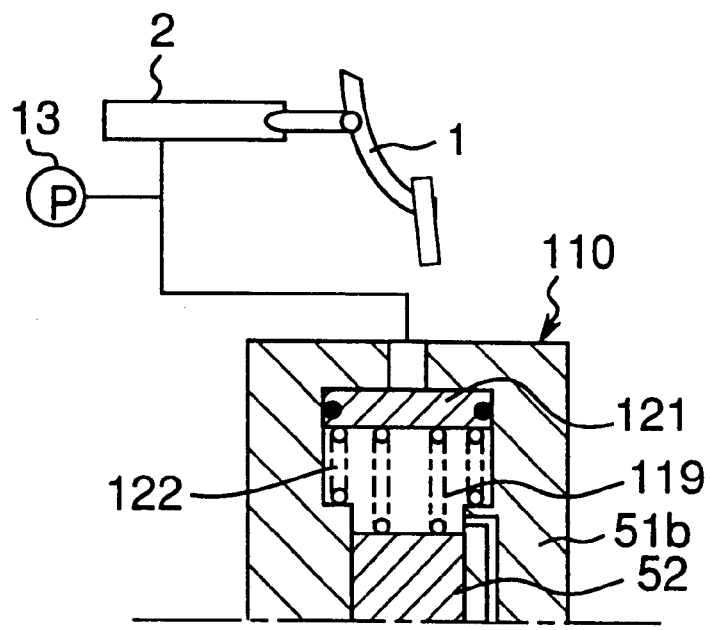

Fig. 9
(a)
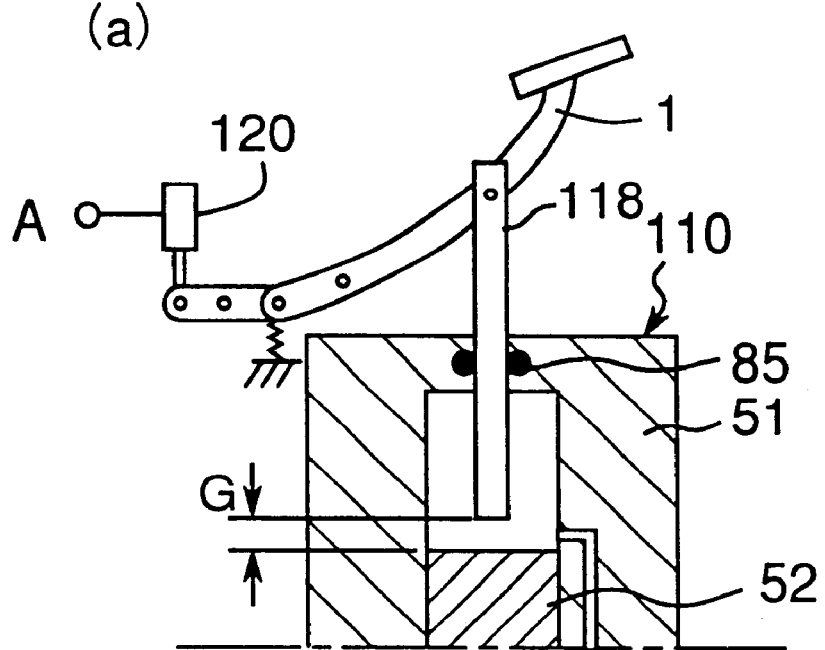
(b)
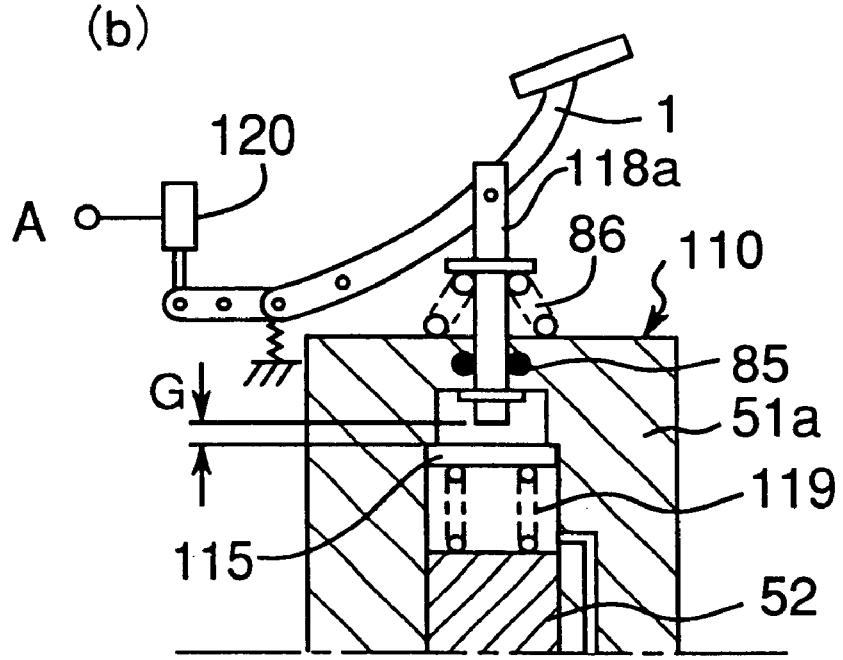

$$P = \frac{a \times I^2 - F}{S}$$

( a : COEFFICIENT )

VEHICLE BRAKING SYSTEM AND VEHICLE BRAKING DEVICE

TECHNICAL FIELD

The present invention relates to a brake system preferably for use with automobiles. In particular, the present invention relates to a brake system for automobiles, in which a braking substance or liquid pressurized by an auxiliary pressure source is adjusted and then supplied for controlling a braking operation of wheels of the automobile in response to the brake stroke of the driver.

BACKGROUND ART

For the automobile brake system, with an increased development of a control system mounted on the automobile and a requirement of stability during driving of an Anti-skid Brake System, referred to as "ABS" hereinafter, and a traction control, instead of a braking operation of a driving person, improved systems for the braking operation of the wheels are available so that an electronic control system reads and then determines an optimal braking condition from the operation of the driving person. Also, some of the systems are equipped with an auxiliary pressure source for the generation of a higher braking pressure in addition to a mechanism for the generation of the braking pressure due to a biasing force applied to a brake pedal by the driving person.

JP 10-86802(A) discloses an example of the above-described brake system, in which a signal that indicates a braking pressure generated by the braking operation of the driving person is transmitted to the controller. In response to the signal, the controller controls a separate pressure generator so that the generator generates and then supplies a braking liquid-pressure to the wheel systems. According to the disclosed system, the liquid pressure generated by the braking operation of the driving person is used only for the generation of the control signal but not used directly for the braking control of the wheel systems.

Also, JP 10-35455(A) discloses another control system. According to the control system, the braking force is calculated based upon a stroke of the pedal. A result of the calculation is then used for an adjustment of a high pressure, generated by the auxiliary pressure source, at a proportional pressure control valve so that a suitably adjusted pressure is transmitted to the wheel systems. In this system, the liquid pressure generated by the pedal operation by the driving person is also used for the braking operation of the wheels.

With reference to the drawings, a conventional brake system for automobiles will be described below. FIG. 11 illustrates an example of the automobile brake system with an auxiliary pressure source. In this drawing, reference numeral 1 indicates a brake pedal on which the driving person applies a biasing force for the brake control of the automobile. Also, the reference numeral 2 indicates a device (hereinafter referred to as a "master cylinder") for generating a pressure force in the braking substrate or liquid according to the braking operation of the driving person. For this purpose, the master cylinder 2 is fluidly connected with two passages or tubes 3 and 4 to a reservoir 5 for the accommodation of a braking substrate or liquid.

The master cylinder 2, which is a tandem cylinder with two pistons arranged in a serial fashion within a cylinder, is capable of providing the pressurized liquid in two ways or passages 6 and 16 fluidly connected at respective ends to respective pistons. The passage 6 is fluidly connected to a switching valve 7 and then branched into two sub-passages 8 and 9. Normally, an electromagnetic valve is preferably used for the valve 7, although another type of valve may be employed instead. The branched passage 8 is fluidly connected with a right-front brake unit 10 and the other branched passage 9 is fluidly connected with a left-rear brake unit 11, for example. When the electromagnetic valve 7 is electrically disconnected from a power source, it is fluidly connected with the passage at its portion, e.g., left portion indicated by an arrow with arrowheads at its opposite ends in the drawing, allowing the liquid in the passage 6 to pass therethrough. On the other hand, when the electromagnetic valve 7 is electrically connected with the power source, it is connected with the passage at its another portion, e.g., right portion, prohibiting the liquid in the passage 6 from passing therethrough. Also, sensors 13 and 14 for sensing a pressure of the liquid in the passage 6 are provided in the passage 6 and on the opposite sides of the valve 7.

Likewise, the passage 16 is connected to an electromagnetic valve 17 and then branched into sub-passages 18 and 19 which are in turn connected with left-front brake unit 20 and right-rear brake unit 21, respectively. The electromagnetic valve 17 has the same structure and connection as those of the valve 7. Also, sensors 23 and 24 are arranged on opposite sides of the valve 17 for the sensing of the pressure in the liquid passing therethrough. Further, although the automobile brake system includes other passages and valves for ABS and traction control, they are eliminated from the drawing for clarity.

In operation of the brake system so constructed, in the state shown in FIG. 11 when the valves are electrically disconnected from the power source, the displacement of the pedal 1 due to the biasing operation of the driving person pressurizes the braking liquid accommodated in the two pistons in the master cylinder 2, which increases the pressure in the passages. The pressure in the passage 6 is transmitted through the electromagnetic valve 7 and then the passages 8 and 9 into brake units in the right-front and left-rear wheel units 10 and 11, respectively, where it is used for the braking control of respective wheels. Likewise, the pressure in the passage 16 is transmitted through the electromagnetic valve 17 and passages 18 and 19 into brake units in the left-front and right-rear wheel units 20 and 21, respectively, where it is used for the braking control of respective wheels.

Afterwards, when the biasing force is removed from the brake pedal, the pressure is removed from the pistons in the master cylinder 2. This also removes the pressure in the passages 6 and 16, which releases the wheels from the braking control thereof.

Descriptions will be made to other parts including an auxiliary pressure source of the brake system. The auxiliary pressure source generally indicated by reference numeral 30 includes a motor 31 with an output shaft connected with two pumps 32. Each pump 32 is fluidly connected at an inlet or suction port thereof through a passage 34 to the reservoir 5 and at an outlet or discharge port through a passage 35 to an accumulator 36 and a sensor 37 for sensing the pressure in the passage. A relief valve 38 is provided for the protection of a disadvantageous rapid increase in pressure within the passages. Also, the passage 35 is fluidly connected to an input port 41 of a proportional pressure control valve 40 which will be described below. The valve 40 has output and return ports 42 and 44 connected with passages 43 and 45, respectively. The passage 45 is branched from the passage 34 and then terminates at the reservoir 5.

The passage 43 connected at its one end to the output port 42 of the valve 40 is branched into a passage 46 which is extended through an electromagnetic valve 47 to the passages 8 and 9, and another passage 48 which is extended through an electromagnetic valve 49 to the passage 18 and 19. In the drawing, the electromagnetic valve 47 is illustrated to be closed when it is disconnected from the power source. An electronic control device 70 is provided so that it is electrically connected at its terminal indicated by alphabet A to terminals of the motor 31 and the valve 40, also indicated by alphabet A. For clarity, the connections thereof are eliminated from the drawing. In addition, although not illustrated in the drawing, the control device 70 is electrically connected to all of the sensors 13, 14, 23, 24 and 37 and the electromagnetic valves 7, 17, 47 and 49.

The operation of the auxiliary pressure source 30 and portions related thereto so constructed will be described hereinbelow. Upon rotation of the motor 31, the pumps 32 are driven to draw the brake liquid from the reservoir 5 through the passage 34 into the accumulator 36. The accumulator 36 may be selected from various types of accumulators. For example, if the piston type accumulator which is made of cylindrical tube with two spring-biased pistons received therein is used, the brake liquid is forced in the accumulator 36 so that the springs are compressed to accumulate the braking force or energy therein. The adjacent pressure sensor 37 senses the braking pressure in the accumulator 36. Then, when the pressure has reached a predetermined value, the sensor 37 transmits a corresponding signal. The signal is then transmitted to the control device 70, which in turn de-energizes the motor 31.

The accumulated pressure decreases by the braking operations, which is sensed by the pressure sensor 37. When the pressure sensor 37 detects that the pressure has decreased to a predetermined value, it transmits a signal to the control device 70. Upon receiving the signal, the control device 70 drives the motor 31 to accumulate the pressure in the auxiliary pressure source 30. This means that the auxiliary pressure source 30 drives the pumps in response to the pressure decrease so that a certain amount of braking energy with the predetermined pressure is always accumulated therein whenever the automobile is electrically powered. The operation of the brake pedal 1 is not directly linked with the pump 32. This ensures that, even when the electric system in the automobile is disabled suddenly during driving, the auxiliary pressure source maintains therein a sufficient braking energy.

The pressure of the brake liquid is transmitted through the passage 35 to the input port 41 of the proportional pressure control valve 40. Then, by a control operation described below, the pressure is further transmitted through the output port 42 to the passage 43 and then branched passages 46 and 48 into the electromagnetic valves 47 and 49. While electrically disconnected from the power source as shown in FIG. 11, the electromagnetic valves 47 and 49 close and the electromagnetic valves 7 and 17 open, which allows the braking pressure to be transmitted through the master cylinder 2 to the control device. Once electrically connected with the power source, the electromagnetic valves 47 and 49 open and the electromagnetic valves 7 and 17 close. This allows the pressure of the braking liquid to be transmitted from the valve 47 through the passages 8 and 9 to the brake units of the right-front and left-rear wheels 10 and 11, and from the valve 49 through the passages 18 and 19 to the brake units of the left-front and right-rear wheels 20 and 21, respectively. This results in the four wheels being well braked. In this braking operation, the brake liquid is accumulated in the auxiliary pressure source 30 with an increased pressure that is higher than that transmitted directly from the master cylinder 2. This results in a greater braking force with less force applied on the pedal by the driver.

While connected with the power source, although not shown, the electromagnetic valves 7 and 17 provided in the respective passages 6 and 16 that connect the master cylinder 2 to the respective wheels are closed. This prevents the pressure generated in the master cylinder due to the biasing operation of brake pedal 1 from being transmitted to the wheels. When the system is electrically connected with the power source, a signal indicating the pressure in the master cylinder 2 is transmitted through the output terminals of the pressure sensors 13 and 23 to the control device 70. Once received, the control device 70 calculates a brake force required for the braking of the wheels in response to the input signal. Then, based upon the calculated brake force, the control device 70 transmits a signal to the valve 40 where the output pressure from the auxiliary pressure source 30 is adjusted to a certain level suitable for the braking control of respective wheels.

When an ignition of the automobile is turned off or the electric system thereof is in a malfunction condition due to any reason, all of the electromagnetic valves are turned off as illustrated in the drawing. In this instance, the breaking pressure caused by the braking operation of the pedal by the driving person is directly transmitted to the wheels 10, 11, 20 and 21. Therefore, although the high pressure in the auxiliary pressure source 30 is not used for the braking operation, a minimum braking force required during the emergency is ensured.

FIG. 12 illustrates an example of the proportional pressure control valve 40 and portions related thereto. It should be noted that like parts are denoted by like reference numerals throughout the drawings. Also, in this drawing, although the automobile has a plurality of wheels and brake systems therefor as shown in FIG. 11, only one wheel and its brake system is illustrated therein for clarity. Likewise, the sensors are also eliminated from the drawing.

In this drawing, the proportional pressure control valve 40 has an actuating or mechanical portion 50 and a control portion 60 indicated as upper and lower portions in the drawing, respectively. The mechanical portion 50 includes a sleeve 51 in the form of a cylinder which is closed at its uppermost end and opened at its lowermost end, and a spool 52 mounted in an interior of the sleeve 51 so that it can move in an axial direction of the sleeve 51 while making a sealing contact with an inner surface of the sleeve 51. The sleeve 51 has three ports; input port 41, output port 42 and return port 44, formed therein so that each of three ports fluidly communicates between interior and exterior thereof. As described above, the three ports are connected with first ends of the passages 35, 43 and 45, respectively.

The spool 52 is formed at its mid portion in the longitudinal direction with a reduced portion 53 which serves as a valve that connects and disconnects between the input port 41 and the return port 44 by a displacement of the spool 52 in the axial direction. The output port 42 communicates with a chamber defined adjacent to the reduced portion 53 irrespective of the position of the spool 52. The reduced portion 53 has a transverse hole 54 that extends in a direction perpendicular to and crossing the axial direction of the spool 52. The transverse hole 54 is fluidly connected with a vertical hole 55 that extends downwardly along the axial direction so that the holes 54 and 55 cooperate with each other to form a T-shaped passage in the spool 52. The vertical hole 55 receives a cylindrical pin 56 so that the pin moves in the axial direction with a sealing contact between an outer surface of the pin and an inner surface of the vertical hole.

The control portion 60, which is mounted in the lower part of the valve 40 and positioned in a coaxial fashion with the mechanical portion 50, has an outer cylindrical portion 61. The cylindrical portion 61 is closed at its lower end that defines one end of the valve 40 and is opened at its upper end that makes a sealing connection with the bottom end of the sleeve 51. An inner diameter of the cylindrical portion 61 is greater than that of the sleeve 51 to form a step at the connection thereof. A coil 62 is wounded around the cylindrical portion 61. Also, provided in the interior of the cylindrical portion 61 is a stop 63 in the form of rod that extends along the axial direction from the bottom end 64. Also, the top end of the stop 63 received the bottom end of the pin 56 to restrict a downward movement of the pin 56.

The spool 52 is formed at its bottom portion with an enlarged cylindrical portion 57 that extends downwardly in the interior of the cylindrical portion 61. The enlarged portion 57 cooperates with a portion of the spool 52 to define a step at an uppermost end of the enlarged portion. The step cooperates with another step formed between the sleeve 51 and the cylindrical portion 61 to define a stop therebetween that restricts an upward movement of the spool 52 and the enlarged portion 57. The enlarged portion 57 is formed from its bottom end with a hole that receives the rod-like stop 63. Also, the enlarged portion 57 is formed at its inner periphery surface with a step. A spring 65 is supported at its opposite ends by the step and the closed end of the cylindrical portion 61 so that it forces the spool 52 upward.

An operation of the proportional pressure valve 40 so constructed will be described hereinbelow. It should be noted that FIG. 12 is in part different from FIG. 11 and illustrates a powered condition, i.e., in which the ignition key is turned on. In this state, upon operation of the brake pedal 1 by the driver, the master cylinder generates a braking pressure that is transmitted to the passage 6. However, since the electromagnetic valve 7 is closed as shown in the powered condition, the pressure is never transmitted directly to the wheel 10. A signal indicative of the pressure in the master cylinder 2 is transmitted from the pressure sensor 13 to the control device 70. Based upon the signal, the control device 70 calculates a required braking pressure and then instructs the control 60 of the valve 40 to apply an electric current necessary for generating the required braking pressure. The coil 62 cooperates with the enlarged portion 57 of the spool 52 to form a solenoid, so that the enlarged portion 57 is attracted to a magnetic field generated by the application of the electric current to the coil 62. This causes the enlarged portion 57 together with the spool 52 to move downward against the biasing force by the spring 65.

With the downward movement of the spool 52, the return port 44 communicated with the reduced portion 53 is closed and then the input port 41 is brought into communication with the reduced portion 53. Since the input port 41 is connected through the passage 35 with the accumulator 36 for accumulating the brake liquid pressurized by the driving of the pump 32, the communication between the input port 41 and the reduced portion 53 allows the pressurized liquid to be fed from the passage 35 through the input port 41 and the peripheral chamber defined by the reduced portion 53 to the output port 42. Then, the liquid is fed through the electromagnetic valve 49 that is opened in the powered condition and through the passages 43 and 48 to the wheel 10.

When the brake pedal 1 is released by the driver, the pressure in the master cylinder 2 decreases, which is transmitted from the pressure sensor 13 to the control device 70. Then, the control device 70 turns off the application of the electric current to the coil 62. This de-energizes the solenoid to cause the spool 52 to move upward due to the force applied thereto by the spring 65. At this moment, the input port 41 is closed to prohibit the braking liquid from flowing into the reduced portion 53. Instead, the reduced portion 53 is connected to the return valve 44, which causes the braking pressure that has been applied to the wheel 10 to be released through the output port 42 into the return port 44.

Another description will be provided of a relationship between the displacement of the brake pedal and the braking pressure liquid pressure. As described above, the signal indicative of the pressure in the master cylinder 2, caused by the stroke of the brake pedal, is transmitted from the pressure sensor 13 to the control device 70. In response to the signal, the control device 70 instructs the valve control 60 of the proportional pressure control valve 40 to apply the electric current I that is proportional to the braking pressure. Typically, it has been known that the force for the solenoid to move the spool varies in proportion to the square of the current.

As described above, the spool 52 includes the transverse hole 54 and a vertical hole 55 in which the pin 56 is inserted. The lowermost end of the pin 56 is exposed to the interior of the cylindrical portion 61 where no braking pressure applies thereto. This means that an excessive pressure (P×S) acts in the transverse hole 54, wherein P: Braking pressure introduced through input port 41;

S: Cross section of pin 56 (corresponding to cross section of vertical hole 55); and F: Biasing force upwardly applied to the spool 52 by the spring 65.

This results in that the spool 52 stays where an upward force that is the sum of the upward force (P×S) and the biasing force F of spring 65 balances to a downward force caused by the coil 61. This balanced state can be indicated by the following equation:

$$P \times S + F = a \times I^2 \ (a: \text{Coefficient})$$

This can be written as follows:

$$P = [a \times I^2 - F]/S$$

This relation, which is graphed as shown in FIG. 13, means that the braking pressure is proportional to the square of the current or the biasing force applied to the brake pedal. This further means that the proportional pressure valve 40 uses the high braking pressure accumulated in the accumulator 36 in order to adjust the required braking pressure to be transmitted to the wheel, depending upon the stroke of the brake pedal.

FIG. 14 illustrates another conventional brake system. The system does not include means for transmitting the liquid pressure in the master cylinder 2, generated by the operation of brake pedal 1, to the wheel 10 directly. Alternatively, a signal indicative of the pressure in the liquid is transmitted to the control device 70. Then, a required pressure for braking is generated only by the operation of the valve 40 driven by the instruction from the control device 70.

As shown, the master cylinder 2 has a pressure sensor 13 for transmitting a signal indicative of the pressure to the control device 70. Also, the braking pressure to be used for braking the wheel 10 is obtained only from the proportional pressure control valve 40. This allows the electromagnetic valve for changing the passages to be eliminated, which simplifies the structure of the brake system. Other parts are the same as those described above and, therefore, no detailed description will be made thereto. With the arrangement, indeed the structure of the brake system can be simplified. However, since no means is included for applying a certain braking pressure to the wheels, a separate structure should be provided for safety during possible emergencies, such as any failure of the electric system.

As described above, for the conventional brake system, the pressure accumulated in the auxiliary pressure source is not used for the braking operation during emergencies caused by, for example, the electric or system failure in the automobile. That is, in the conventional brake system disclosed in JP 10-86802(A), although the pressurized liquid is accumulated in the auxiliary pressure source, it is prohibited by the electromagnetic valve from being transmitted to the wheels during electric failure. Also, the pressure generated by the pedal operation is not transmitted to the wheels, which disadvantageously brings the automobile into a condition in which no braking pressure is applied to the wheels. To prevent this, another auxiliary brake system should be provided.

On the other hand, the brake system disclosed in JP 10-35455(A) is designed so that the pressure in the liquid generated by the operation of the brake pedal is transmitted to the wheels even during emergencies in which no electric power is supplied to the brake system. This ensures a certain braking force, although it might be a minimum braking pressure caused by the driver, that must be ensured by the manufactures. During electric system failure, the pressure accumulated in the auxiliary pressure source is prevented by the electromagnetic valve from being transmitted to the wheels. This means that the pressure is not used effectively for the braking during emergencies.

SUMMARY OF THE INVENTION

An object of the present invention is to provide a brake system for automobiles, which is capable of exploiting the braking energy, accumulated in the auxiliary pressure source, not only under the normal condition but also during emergencies such as electric or system failure thereof.

In order to address the aforementioned problems, the brake system of the present invention includes an auxiliary control means for activating a proportional pressure control valve even in emergency such as in a malfunction of an electrical failure. Alternatively, the auxiliary control means actuates the proportional pressure control valve in accordance with a stroke of the brake pedal for generating higher pressure. The braking energy stored in the auxiliary pressure source is transmitted to each wheel for generating sufficient braking force. Details will be discussed hereinafter.

One aspect of the present invention relates to a brake system for use with automobiles, including: signal generating means for generating a signal in response to a stroke of a brake pedal; pressurized liquid accumulating means for pressuring a braking liquid and storing the same therein; proportional pressure control means for adjusting the pressure of the braking liquid in accordance with the signal output from the signal generating means, and for transmitting the adjusted pressure of the braking liquid to the wheels; and auxiliary control means for controlling the proportional pressure control means while electrically disconnected with a power source so that the pressurized braking liquid provided through the proportional pressure control means can be used as a braking force. Thus, the pressurized braking liquid stored in the pressurized liquid accumulating means can be exploited for obtaining an effective braking force even in the off-powered condition.

Another aspect of the present invention relates to a brake system for use with automobiles, including: signal generating means for generating a signal in response to a stroke of a brake pedal; pressurized liquid accumulating means for pressuring a braking liquid and storing the same therein; proportional pressure control means for adjusting the pressure of the braking liquid in accordance with the signal output from the signal generating means, and for transmitting the adjusted pressure of the braking liquid to the wheels; and auxiliary control means for controlling the proportional pressure control means once the brake pedal is stepped beyond a predetermined stroke; wherein the proportional pressure control means is controlled both by the signal output from the signal generating means and by the auxiliary control means so that the pressurized braking liquid provided through the proportional pressure control means can be used as a braking force. Thus, the operation of the brake pedal can activate the proportional pressure control means even in the on-powered and off-powered conditions.

Even another aspect of the present invention relates to a brake system for use with automobiles, in which the auxiliary control means actuates the proportional pressure control means in accordance with the pressure of the braking liquid generated by the stroke stepped by the driver. Also, the auxiliary control means may actuate the proportional pressure control means through an elastic member in accordance with the pressure of the braking liquid generated by the stroke stepped by the driver.

Even another aspect of the present invention relates to a brake system for use with automobiles, in which the auxiliary control means has a moving portion engaging with the brake pedal, the moving portion directly actuating the proportional pressure control means in accordance with the stroke stepped by the driver. Also, the auxiliary control means may have a moving portion engaging with the brake pedal, the moving portion directly actuating the proportional pressure control means through an elastic member in accordance with the stroke stepped by the driver.

Even another aspect of the present invention relates to a brake system for use with automobiles, including: a master cylinder for generating a pressure of a braking liquid in response to a stroke of a brake pedal; a liquid pressure sensor for detecting the pressure of the braking liquid within the master cylinder; a reservoir for storing the braking liquid; an auxiliary pressure source for pressurizing the brake liquid within the reservoir and for accumulating the pressurized braking liquid; a controller for calculating a braking liquid pressure required for braking wheels, based upon information output from the liquid pressure sensor; a proportional pressure control valve for adjusting the pressurized braking liquid in accordance with an electric signal output from the controller; a passage for communicating the braking liquid within the master cylinder to the proportional pressure control valve; a switching valve intervened in the passage for communicating the braking liquid while electrically disconnected with a power source and for blocking the same while electrically connected with the power source; and an auxiliary control mechanism for causing the proportional pressure control valve to adjust the braking liquid pressure pressurized by the auxiliary pressure source in accordance with the pressure transmitted from the master cylinder. To this end, in the vehicle brake system, which does not transmit the liquid pressure within the master cylinder directly to the wheels, the sufficient braking force can be obtained in the off-powered condition.

Instead of the switching valve intervened in the passage, a relief and return valves can be used. The relief valve transmits the braking liquid within the master cylinder, if the pressure of the braking liquid is exceeding over a predetermined value. The return valve returns the braking liquid from the proportional pressure control valve to the master cylinder, if the pressure of the braking liquid is released. Thus, the operation of the brake pedal can activate the proportional pressure control valve even in the on-powered and off-powered conditions.

Even another aspect of the present invention relates to a brake system for use with automobiles, including: a master cylinder for generating a pressure of a braking liquid in response to a stroke of a brake pedal; a liquid pressure sensor for detecting the pressure of the braking liquid within the master cylinder; a first passage for transmitting the pressure of the braking liquid within the master cylinder to wheels; a first switching valve intervened in the first passage, for transmitting the pressure of the braking liquid within the master cylinder to wheels while electrically disconnected with a power source, and for blocking the same while electrically connected with the power source; a reservoir storing the braking liquid; an auxiliary pressure source for pressurizing the braking liquid within the reservoir and for accumulating the pressurized brake liquid; a controller for calculating a braking liquid pressure required for braking wheels, based upon information output from the liquid pressure sensor; a proportional pressure control valve for adjusting the pressurized braking liquid in accordance with an electric signal output from the controller; a second passage for communicating the pressurized braking liquid adjusted by the proportional pressure control valve to wheels; a second switching valve intervened in the second passage, for transmitting the pressurized braking liquid adjusted by the proportional pressure control valve to the wheels, while electrically connected with the power source, and for blocking the same while electrically disconnected with the power source; a third passage for communicating the braking liquid within the master cylinder to the proportional pressure control valve; a third switching valve intervened in the third passage, for transmitting the braking liquid within the master cylinder to the proportional pressure control valve, while electrically connected with the power source, and for blocking the same while electrically disconnected with the power source; an auxiliary control mechanism for causing the proportional pressure control valve to adjust the braking liquid pressure pressurized by the auxiliary pressure source in accordance with the pressure transmitted from the master cylinder through the third passage to the proportional pressure control valve; a fourth passage for bypassing the second switching valve selectively transmitting and blocking the second passage; and a booster piston intervened in the fourth passage, while the second switching valve blocks the second passage and the pressurized braking liquid adjusted by the proportional pressure control valve is transmitted to the fourth passage, for blocking the first passage that communicates the braking liquid within the master to the wheels, and for pressurizing the braking liquid applied to the wheels. To this end, in the vehicle brake system, which transmit the liquid pressure within the master cylinder directly to the wheels, the pressurized braking liquid stored in the accumulator can be used so that the sufficient braking force can be obtained even in the off-powered condition.

Instead of the third switching valve intervened in the third passage, a relief and return valves can be used. The relief valve transmits the braking liquid within the master cylinder, if the pressure of the braking liquid is exceeding over a predetermined value. The return valve returns the braking liquid from the proportional pressure control valve to the: master cylinder, if the pressure of the braking liquid is released. Thus, the operation of the brake pedal can activate the proportional pressure control valve even in the on-powered and off-powered conditions.

Even another aspect of the present invention relates to a brake system for use with automobiles, in which instead of, or in combination with the liquid pressure sensor, a stroke sensor is provided for detecting the stroke of the brake pedal, and the controller calculates the braking liquid pressure required for braking wheels, based upon information output from the stroke sensor, instead of, or in combination with information output from the liquid pressure sensor. The more suitable braking operation can be realized.

Even another aspect of the present invention relates to a brake system for use with automobiles, including: a stroke sensor for detecting a stroke of a brake pedal; a reservoir for storing a braking liquid; an auxiliary pressure source for pressurizing the brake liquid within the reservoir and for accumulating the pressurized braking liquid; a controller for calculating a braking liquid pressure required for braking wheels, based upon information output from the stroke sensor; a proportional pressure control valve for adjusting the pressurized braking liquid supplied from the auxiliary pressure source in accordance with an electric signal output from the controller; and an auxiliary control mechanism including a moving portion engaging with the brake pedal, the moving portion directly actuating the proportional pressure control mechanism in accordance with the stroke, if the brake pedal is stepped beyond a predetermined stroke. Thus, the operation of the brake pedal can mechanically control the proportional pressure control valve even in the on-powered and off-powered conditions.

Even another aspect of the present invention relates to a brake system for use with automobiles, in which the auxiliary control mechanism includes a push rod positioned with the brake pedal that opposes to a spool switching the proportional pressure control valve or an extension portion thereof with a predetermined gap therebetween, and the push rod contacts with the spool or extension portion thereof after the brake pedal is stepped beyond a predetermined stroke, and presses it. Also, the spool, the extension rod, or the push rod may be partially made of elastic material, and the elastic material may be a spring.

Even another aspect of the present invention relates to a brake system for use with automobiles, in which the auxiliary control mechanism includes an extension rod extending from a spool switching the proportional pressure control valve, and an electromagnetic clutch installed with the extension rod, and upon receiving a signal indicating that the brake pedal is stepped beyond a predetermined stroke, the electromagnet clutch holds the extension rod so as to press the spool through the extension rod.

Even another aspect of the present invention relates to a brake system for use with automobiles, including: a stroke sensor for detecting a stroke of a brake pedal; a reservoir for storing a braking liquid; an auxiliary pressure source for pressurizing the brake liquid within the reservoir and for accumulating the pressurized braking liquid; a controller for calculating a braking liquid pressure required for braking wheels, based upon information output from the stroke sensor; a proportional pressure control valve for adjusting the pressurized braking liquid supplied from the auxiliary pressure source in accordance with an electric signal output from the controller; and an auxiliary control mechanism including a moving portion engaging with the brake pedal, the moving portion directly actuating the proportional pressure control mechanism in accordance with the stroke, while electrically disconnected with a power source.

Even another aspect of the present invention relates to a brake system for use with automobiles, in which the auxiliary control mechanism includes an extension rod extending from a spool switching the proportional pressure control valve, and an electromagnetic clutch installed with the extension rod, and the electromagnet clutch holds the extension rod so as to press the spool through the extension rod, while electrically disconnected with a power source.

BRIEF DESCRIPTION OF THE DRAWINGS

FIGS. 7(a) and 7(b) are partial schematic views of modifications of the alternative embodiment shown in FIG. 6.

FIGS. 9(a) and 9(b) are partial schematic views of modifications of the alternative embodiment shown in FIG. 8.

DETAILED DESCRIPTION OF THE PREFERRED EMBODIMENTS

Figure 1:
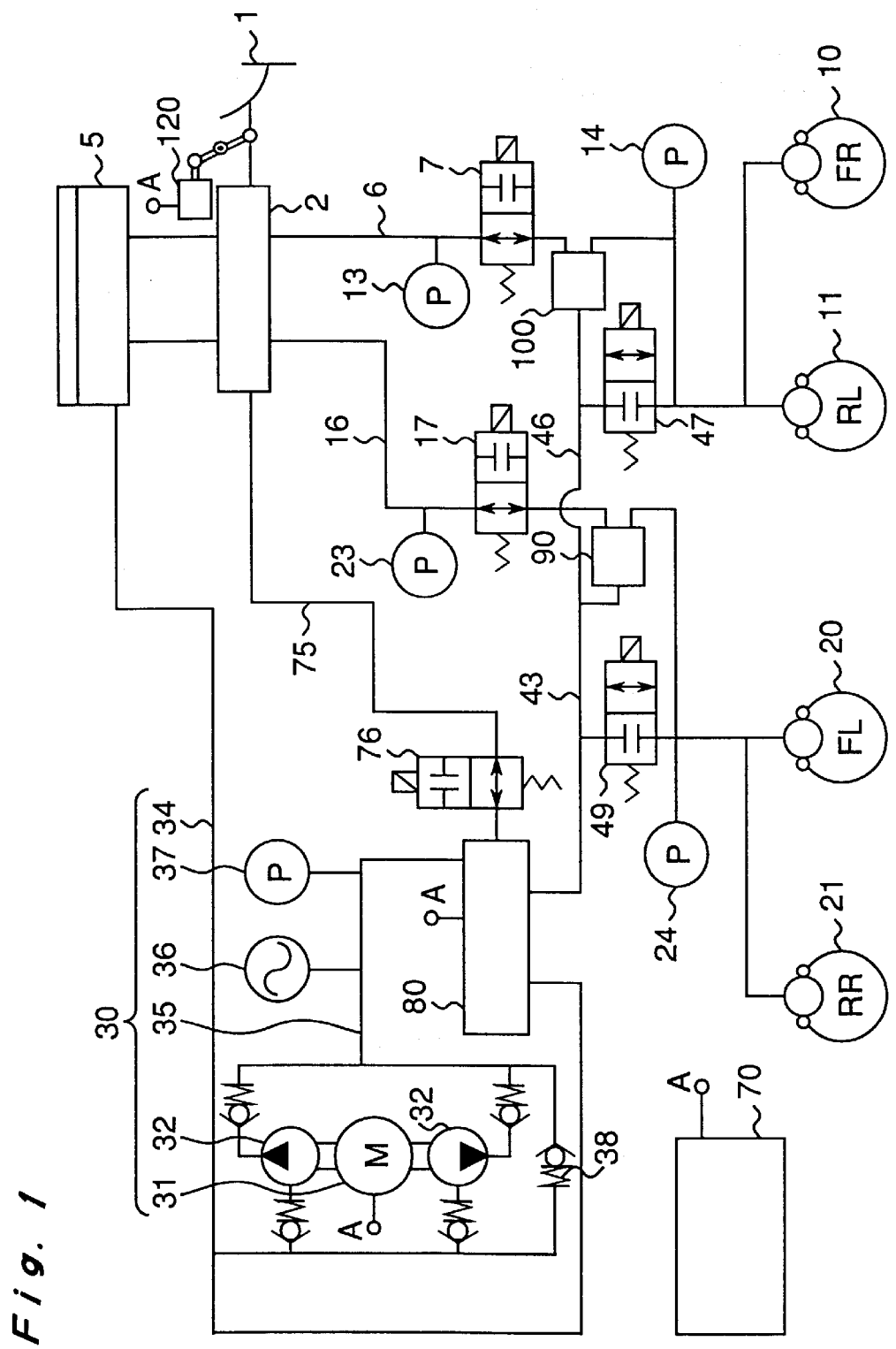
FIG. 1 is a schematic block diagram of the preferred embodiment of a brake system for use of automobiles according to the present invention.
Figure 11:
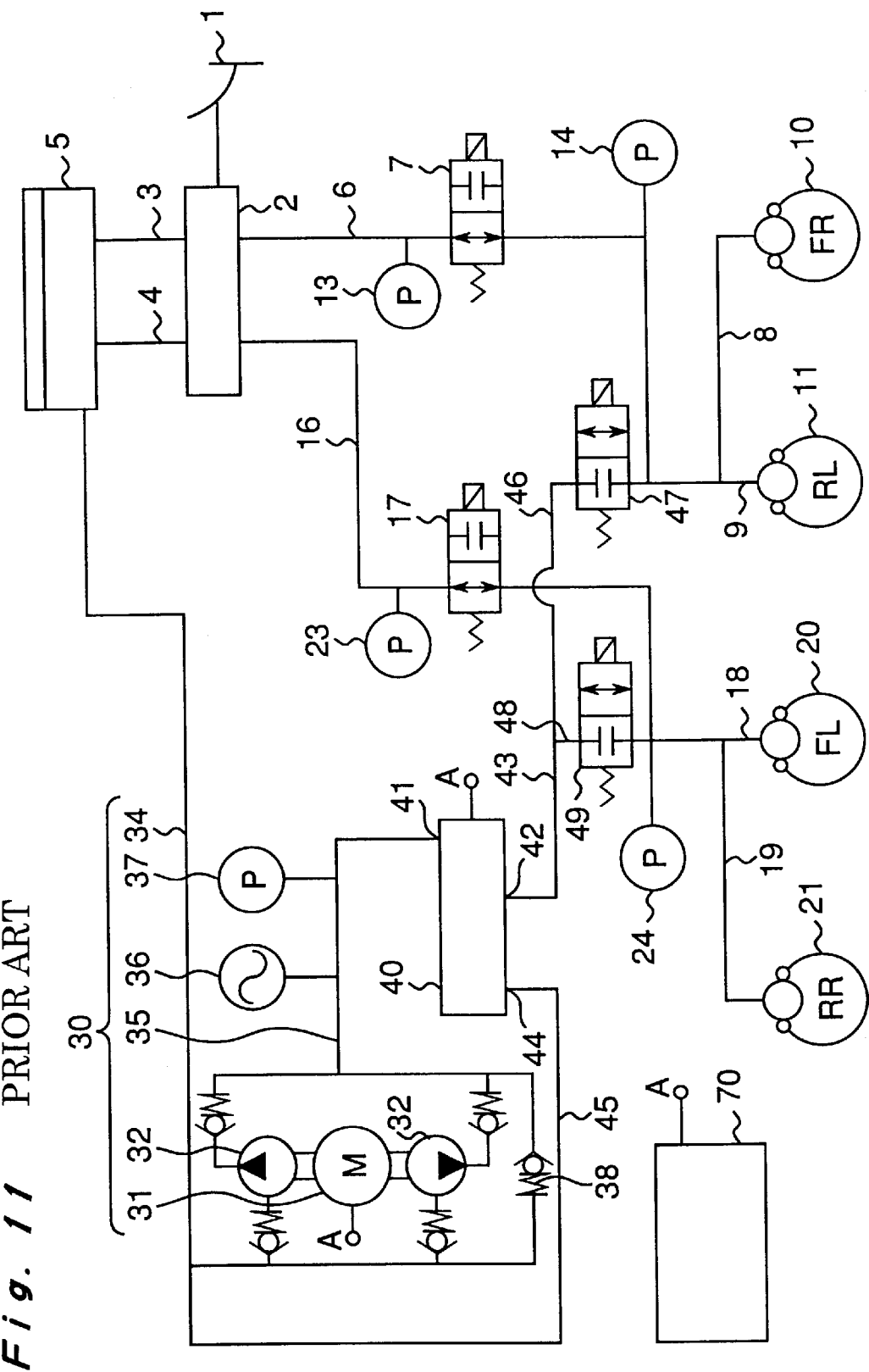
FIG. 11 is a schematic block diagram of a prior art brake system for use with automobiles.

With reference to the drawings, a first preferred embodiment of a brake system for automobiles according to the present invention will be described in detail. FIG. 1 illustrates a brake system for automobiles according to an embodiment of the present invention, which includes additional components added to the conventional brake system described above and illustrated in FIG. 11. In the drawing, added is a passage 75 that connects between the master cylinder 2 and the proportional pressure control valve 80 and includes an electromagnetic valve 76 intervened therein.

While the brake system is not applied with an electric power, the electromagnetic valve 76 is opened so that pressure in the master cylinder 2 is transmitted to the valve 80 as shown in the drawing. The valve 80 has additional features that are not provided in the conventional proportional pressure control valve 40, which will be described hereinafter.

Booster pistons 90 and 100 are positioned and fluidly connected between the passages (higher pressure passages) 43 and 46 extended from the auxiliary pressure source and the passages (lower pressure passages) 6 and 16 extended from the master cylinder 2, respectively. This allows the higher pressure and lower pressure passages to be connected and disconnected so that the braking pressure applied to the braking units for the wheels to be increased, which will be described in detail hereinafter. An optional stroke sensor 120 is provided so that it senses the stroke of the pedal 1 stepped by the driver.

Figure 2:
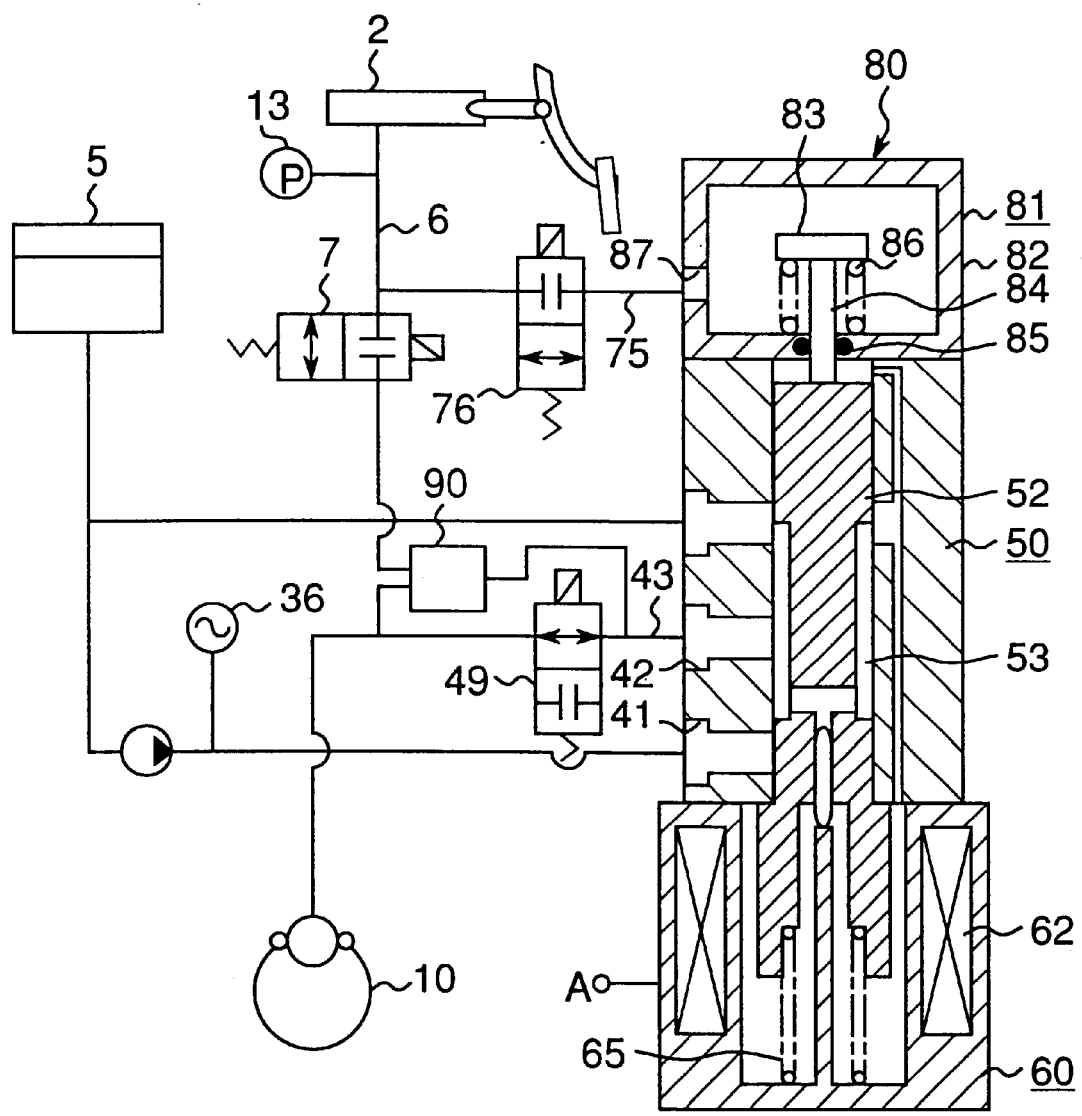
FIG. 2 is a partial schematic view of the brake system in FIG. 1, illustrating a proportional pressure control valve in detail.

FIG. 2 illustrates a structure of the proportional pressure control valve 80 and portions related thereto. For clarity, there is shown only a part, i.e., one unit of the brake system and one wheel related thereto, and other portions such as sensors are eliminated therefrom, although the brake system of the present invention has four units for respective wheels and sensors as illustrated in FIG. 1. Comparing with the proportional pressure control valve 40, the proportional pressure control valve 80 according to the present invention includes an auxiliary control portion 81 in addition to the mechanical portion 50 and the control portion 60 provided in the conventional valve.

The auxiliary control portion 81 has a casing 82 made from a hollow cylindrical member closed at opposite longitudinal end walls thereof. One closed end wall of the casing 82 is fixedly and tightly connected to the upper end portion of the mechanical portion 50 in a coaxial fashion therewith. The other closed end wall of the casing 82 defines one end, i.e., topmost end in the drawing, of the proportional pressure control valve 80. Provided within the casing 82 is an auxiliary piston 84, which has a flange 83 at its one end thereof and extends from an interior of the casing through a hole formed in the lowermost end wall of the casing 82 to the exterior of the casing 82 adjacent to the top end of the spool 52 at its other end. A sealing ring such as an O-ring 85 is provided around the auxiliary piston 84 and in the through-hole so that the auxiliary piston 84 is sealingly and movably supported in the through-hole. A biasing member such as helical spring 86 is provided between the flange 83 and the lower end wall of the casing 82, adjacent to the mechanical portion 50, so that the auxiliary piston 84 is biased upwardly. Although not shown, the auxiliary piston 84 is formed at its periphery, below the bottom end wall of the casing 82, with a peripheral cutouts or groove in which a stop such as E-ring is engaged in order to prevent the piston 84 from being pulled out of the through-hole into the interior of the casing 82.

The casing 82 has a pressure control port 87 formed therein to which one end of the passage 75 is fluidly connected so that the interior of the casing 82 is fluidly connected through the electromagnetic valve 76 with the master cylinder 2. In the powered condition shown in FIG. 2, the electromagnetic valve 76 is closed so that, in the normal driving condition, the auxiliary control portion 81 does not cooperate with the braking operation. Other portions of the valve 80 including the mechanical portion 50 and the control portion 60 functions as described above irrespective of the auxiliary control portion 81.

Next, an operation of the proportional pressure control valve 80 so constructed will be described. As in the conventional brake system, any electric failure of the brake system disconnects the coil 62 of the control portion 60 in the proportional pressure control valve 80 from the power source, which results in the malfunction of the proportional pressure control valve 80. This further results in the sufficient braking energy that is accumulated in the accumulator 36 not being available for the braking control. Notwithstanding, since the electromagnetic valves 7 and 76 are switched open so that the liquid pressure of the master cylinder 2 is transmitted through the electromagnetic valve 7 to the wheel 10, the minimum braking control can be assured.

In the proportional pressure control valve 80 of the present invention, the disconnection of power to the additional electromagnetic valve 76 makes the valve open so that the liquid pressure of the master cylinder 2 is transmitted through the passage 75 and the pressure control port 87 into the casing 82 of the auxiliary control portion 81. The above-mentioned auxiliary piston 84 is provided in the casing 82. The flange 83 of the auxiliary piston 84 receives the liquid pressure across an upper surface thereof. Also, the lower surface of the flange 83 is connected with one end of the auxiliary piston 84, of which other end is exposed outside the casing 82. Therefore, the pressure corresponding to the cross-sectional area of the auxiliary piston 84 is applied to the flange 83 in the direction from the top to the bottom, i.e., downwardly in the drawing. Thus, the auxiliary piston 84 is pressed down against the biasing force of the spring 86.

Since the lowermost end of the auxiliary piston 84 is close to or in contact with the uppermost end of the spool 52 of the proportional pressure control valve 80, the downward movement of the auxiliary piston 84 presses down the spool 52 against the biasing force. Eventually, the channel defined by the reduced portion 53 of the spool 52 fluidly communicates with the input port 41 so that the pressurized braking liquid stored in the accumulator 36 is transmitted to the passage 43 through the input port 41, the reduced portion 53, and the output port 42. Meantime, the electromagnet valve 49 is switched to the closed position from the open position illustrated in the drawing. Thus, the pressure of the braking liquid is transmitted to an additional component of the present invention, i.e., a booster piston 90.

Figure 3:
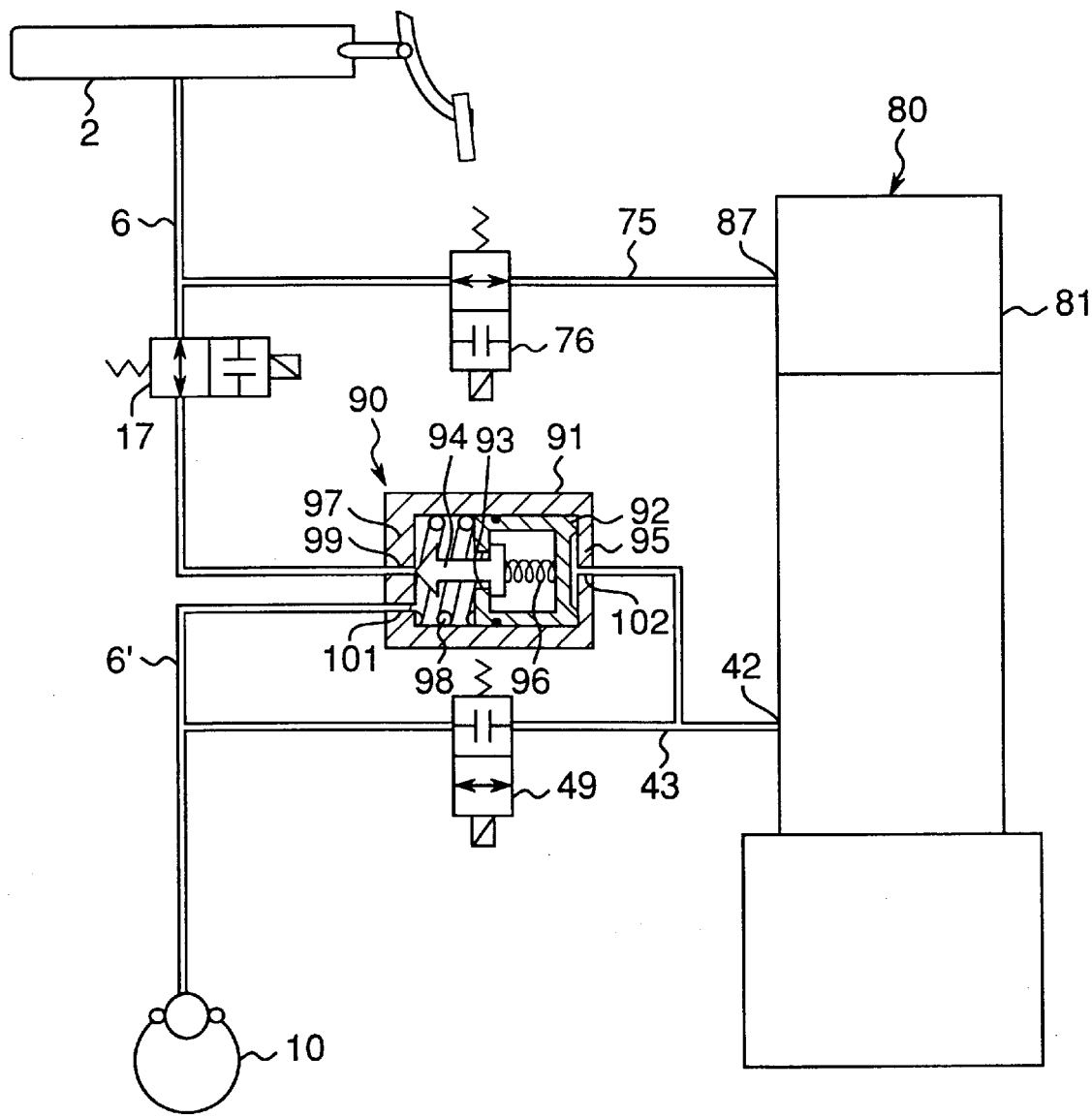
FIG. 3 is another partial schematic view of the brake system in FIG. 2, illustrating a proportional pressure control valve in detail.

FIG. 3 is a schematic view illustrating the structure of the booster piston 90 and other related components thereof. Contrary to FIG. 2, FIG. 3 shows the off-powered condition where the electric system is not supplied with the electric power. The booster piston 90 includes a pair of overlapping hollow cylindrical members having both closed ends in the axial direction, in which the outer cylindrical member is a cylinder 91 and the inner is a piston 92. The piston 92 is arranged in the cylinder 91 with sealing contact therebetween so that the piston 92 can slide in the axial direction. The piston 92 has a through-hole 93 on one end thereof, through which a needle valve 94 extends from the inside of the piston 92. Also, the needle valve 94 is biased towards the through-hole 93 by a spring 96 arranged between the other end of the piston 92 and an inside end of the needle valve 94. Also, an another spring 98 arranged between the left end 97 of the cylinder 91 opposing to the needle valve 94 and the left end of the piston 92 biases the piston 92 towards a direction (from the left to the right in the drawing), where the needle valve is pressed down so as to open the valve.

A port 99 serving also as a valve seat is provided on the center of the left end 97 of the cylinder 91, opposing to the needle valve 94. The port 99 is fluidly connected with the passage 6 in communication with the master cylinder 2. Another port 101 is defined in the left end 97 of the cylinder 91 so as to connect the booster piston 90 with the wheel 10 through the passage 6'. Also, defined in the right end of the cylinder 91 opposing to the left end 97 is a port 102 fluidly connected with the output port 42 of the proportional pressure control valve 80.

Even if the electric system shuts down, usage of the booster piston 90 so constructed in cooperation with the braking operation of the driver causes the auxiliary control portion 81 illustrated in FIG. 2 to activate the proportional pressure control valve 80. Thus, the high pressure of the braking liquid generated by the auxiliary pressure source can be transmitted to the passage 43 through the output port 42. Then, because the electromagnetic valve 49 is closed, the high pressure is guided to the booster piston 90 bypassing the electromagnetic valve 49. Thus, the high pressure of the braking liquid is transmitted through the port 102 of the booster piston 90 into the cylinder 91 so that, depending upon the difference between the pressures applied to the port 99 and 102, the piston 92 moves towards the left direction in the drawing to forward the needle valve 94 against the biasing force of the spring 98. To this end, the needle valve 94 closes the port 99 so as to stem the liquid in the passage 6 communicating between the master cylinder 2 and wheel 10. The biasing force of the spring 96 keeps the port 99 closed. Further, the liquid pressure from the port 102 advances the piston 92, and then the braking liquid confined within the cylinder 91 is pressurized, which is transmitted as the braking pressure through the port 101 and the passage 6' to the brake system of the wheel 10 so as to generate the braking force.

If the high-pressurized braking liquid is not accumulated in the auxiliary pressure source, then the booster piston 90 is not activated so that the needle valve 94 maintains the port 99 open. Therefore, the passage 6 communicates with the passage 6' through the port 99 and 101 whereby the liquid pressure generated within the master cylinder 2 is transmitted directly to the wheel 10. According to the present invention, even if the electric system fails down, in case where the high-pressurized braking liquid is accumulated in the auxiliary pressure source, the stepping force of the driver can activate the stronger braking force with use of the high-pressurized braking liquid so as to ensure safety in emergency, and also in a condition in which the accumulated high pressure is not available, the minimum braking force can be ensured.

In the normal operation with the power supplied, the electromagnet valve 49 is open. Thus, the pressures applied to between the port 99 and the port 101 are the same so that the piston 92 is maintained still and the port 101 is kept open. Therefore, in the normal operation, no passage connecting with the booster piston 90 defines the bypassing passage of the electromagnet 49, and the booster piston 90 gives no contribution to the operation of the system. All of the braking liquid pressures are transmitted to the wheel 10.

Figure 4:
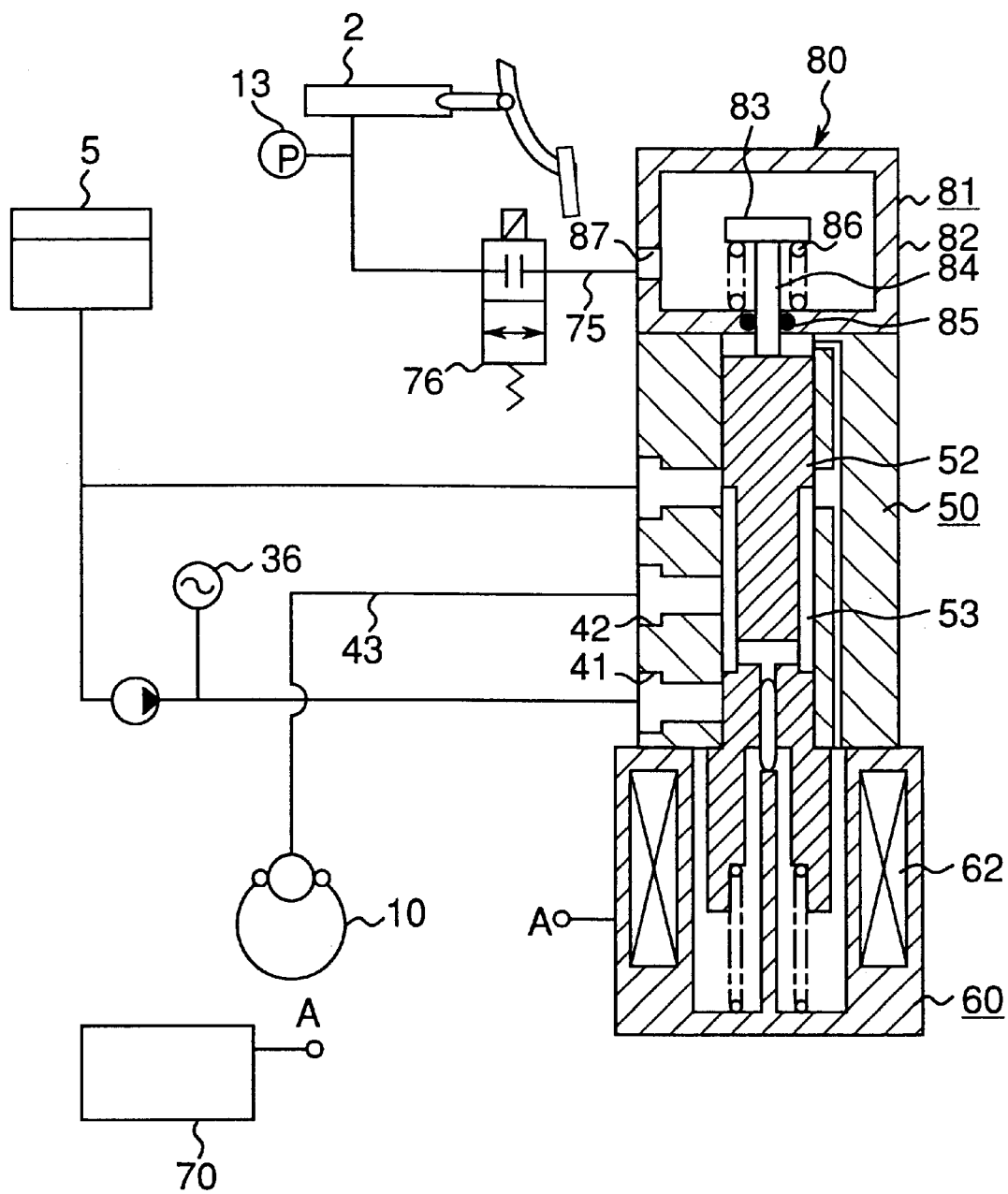
FIG. 4 is a partial schematic view of another preferred embodiment of the brake system illustrating a proportional pressure control valve in detail.

Next, with reference to the drawings, a second preferred embodiment of a brake system for automobiles according to the present invention will be described in detail. FIG. 4 is a schematic view of the brake system according to an embodiment of the present invention, in which the pressure of the braking liquid is not transmitted directly from the master cylinder 2 but exclusively from the proportional pressure control valve to the wheel 10. In the drawing, reference numeral 80 denotes the proportional pressure control valve including the auxiliary control portion 81, in which the pressure control port 87 is connected with the master cylinder through the passage 75 and the electromagnet valve 76. Because the structure of the auxiliary control portion 81 is the same as that illustrated in the first embodiment, no further description will be made. In the brake system of the embodiment, since the liquid pressure is transmitted to the wheel only through the proportional pressure control valve 80, no electromagnetic valve is required for switching the passage of the pressure. Thus the booster piston 90 serving as a bypass during the electrical malfunction is also eliminated. To this end, the whole structure of the system can be simplified.

Basically, the operation of the vehicle brake system so constructed is similar to that of the first embodiment. In the normal operation (i.e., in powered condition), the closure of the electromagnetic valve 76 as shown in the drawing does not activate the auxiliary control portion 81, the braking pressure is applied to the wheel 10 from the proportional pressure control valve 80 that adjusts the pressure in response to the instruction output from the control portion 70 to the valve control portion 60 having the solenoid. Once the electric system of the automobile fails due to any reasons, the electromagnetic valve 76 is open so that the liquid pressure within the master cylinder 2 is transmitted to the auxiliary control portion 81 of the proportional pressure control valve 80. Then, as described above, the auxiliary piston 84 is pressed down to activate the proportional pressure control valve 80 so that the high pressure of the braking liquid stored in the accumulator 36 is transmitted to the wheel 10. Adding the simple component of the present invention to the brake system, which does not itself generate the braking force during the electric failure and has no fail-safe function, advantageously causes the brake system to generate the usual braking force even in such emergency.

Figure 5:
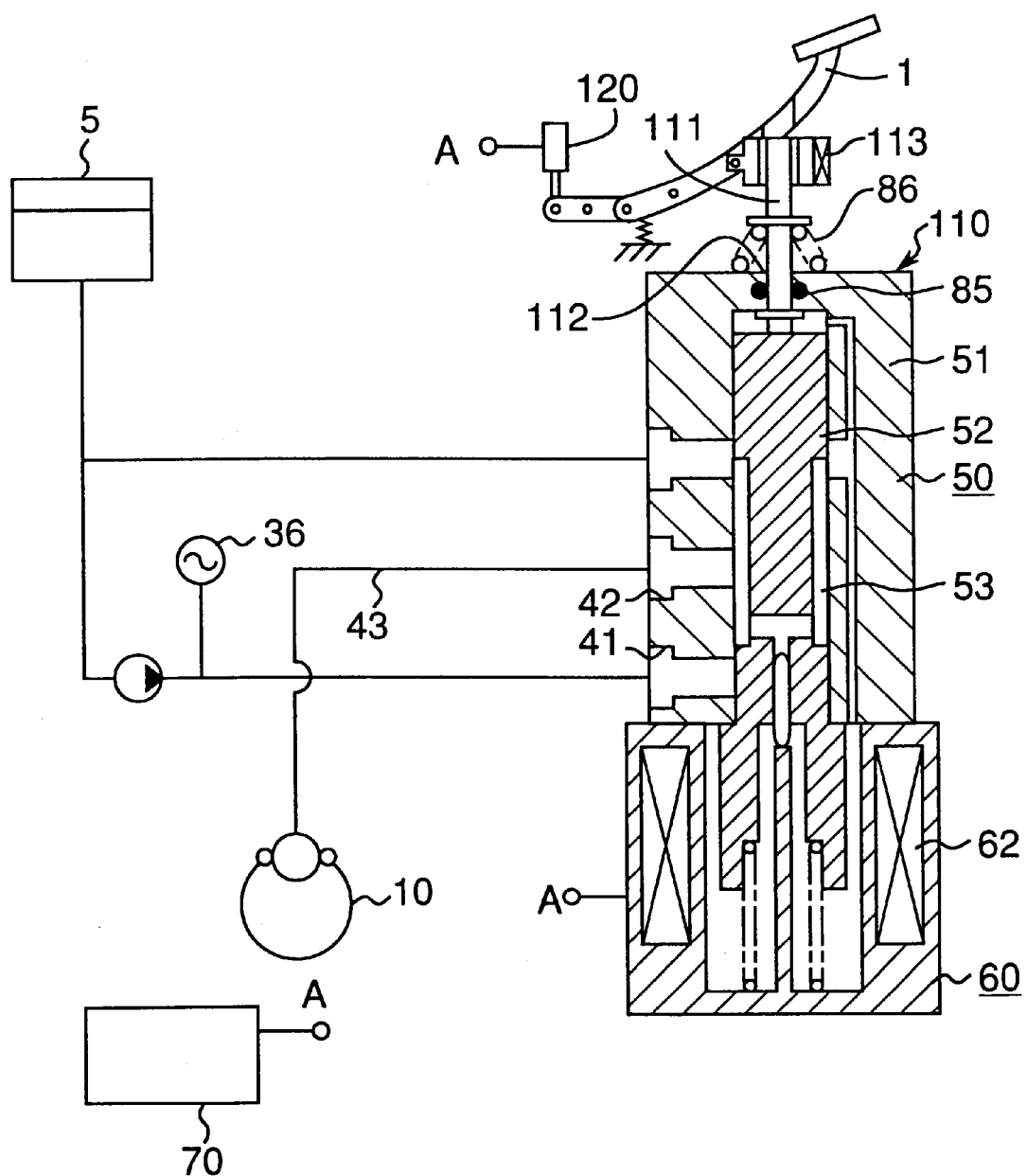
FIG. 5 is a partial schematic view of another preferred embodiment of the brake system illustrating a proportional pressure control valve in detail.

Next, with reference to the drawings, a third preferred embodiment of a brake system for automobiles according to the present invention will be described in detail. FIG. 5 is a schematic view of the brake system according to an embodiment of the present invention. The proportional pressure control valve 110 of the embodiment is similar to the conventional one described above and illustrated in FIG. 14 except that it is provided with an extension rod 111 extending from the uppermost end of the spool 52 via a through-hole 112 formed on the closed end of the sleeve 51, and with an O-ring 85 arranged within the through-hole 112 for sealing the extension rod 111. The extension rod 111 is biased by a spring 86, upwardly in the drawing. Also, a flange is positioned so as to prevent the extension rod from upwardly slipping off due to the biasing force. An electromagnetic clutch 113 is provided with the brake pedal 1 for holding or releasing the extension rod 111. The electromagnetic clutch 113 of the embodiment is designed so that it releases the extension rod 111 to set it free during the powered condition of the automobiles, and holds the extension rod 111 during the off-powered condition. Although the stroke sensor 120 is provided with the brake pedal 1, it is not limited thereto, and any other sensors such as a combination of master cylinder 2 and the pressure sensor 13 and a stepping force sensor may be utilized. Other structures of the embodiment are similar to those of the conventional vehicle braking system illustrated in FIG. 14.

In operation of the brake system used for automobiles according to the present invention, the stroke of the brake pedal 1 stepped by the driver is detected by the stroke sensor 120. The stroke sensor 120 output a signal to the control device 70, which in turn, moves the proportional pressure control valve 10 in response to the stroke. The movement of the proportional pressure control valve 110 leads the pressurized braking liquid therein so as to advantageously be used for braking the wheel. This operation is similar to that of the prior art.

In case where the automobile is disconnected from the power, the conventional proportional pressure control valve 40 is inoperable to exploit the high pressure of the braking liquid as described above. Contrary to this, according to the present invention, the electromagnetic clutch 113 grasps or holds the extension rod 111 in the off-powered condition. This causes the force applied to the brake pedal 1 to be transmitted directly through the electromagnet clutch 113 to the extension rod 111. Then, the extension rod 111, in turn, presses the spool 52 downwardly so that the pressurized braking liquid stored within the accumulator 36 can be conducted into the input port 41. As above, the pressurized braking liquid can be used to ensure the braking force sufficient for braking the wheel, even in the off-powered condition.

Figure 14:
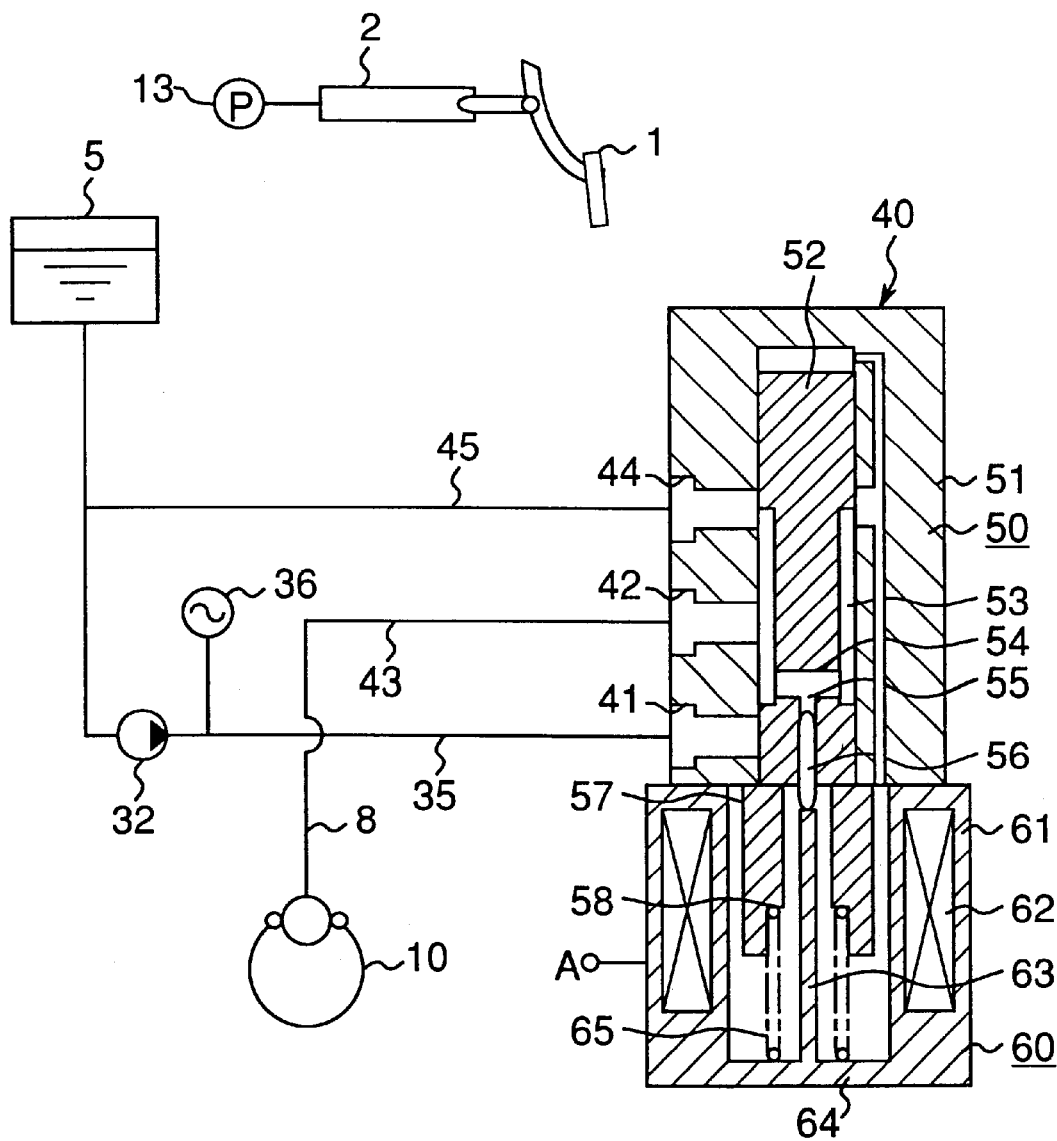
FIG. 14 is a schematic block diagram of another prior art brake system for use with automobiles.

Although the embodiment of the present invention illustrated in FIG. 5 is applied to the prior art brake system shown in FIG. 14, it is not limited thereto, and it may also be applied to any types of vehicle brake systems. Also, the extension rod 111 is indicated as a separate component in FIG. 5, however, it may be formed integrally with the spool 52 that extends upwardly through the sleeve 51 up to the electromagnet clutch 113 for holding or releasing an extending portion thereof. To this end, the provision of the simple component of the present invention with the brake system, which does not itself generate the braking force during the electric failure and has no fail-safe function, advantageously causes the brake system to generate the usual braking force even in such emergency.

Further, with reference to the drawings, a fourth preferred embodiment of a brake system for automobiles according to the present invention will be described in detail hereinafter. One of the objects of the foregoing embodiments is to exploit the high pressure of the braking liquid stored in the accumulator sufficiently for braking the wheels while the electric system of the automobiles fails. In addition, while the electric system of the automobiles does not fail, i.e., in the powered condition, the high pressure of the braking liquid can be applied in response to the stroke of the brake pedal for effectively braking the wheels.

Figure 6:
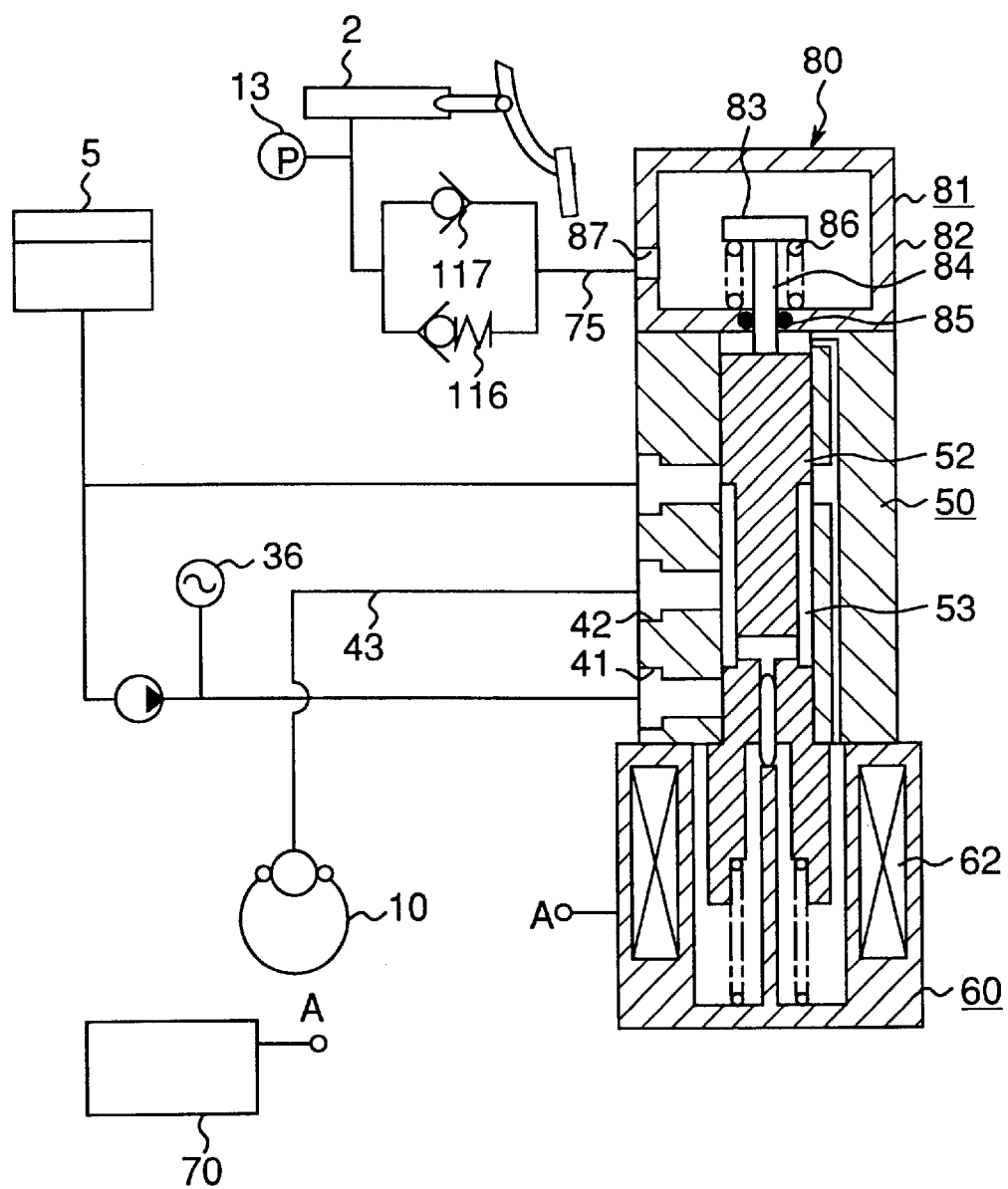
FIG. 6 is a partial schematic view of another preferred embodiment of the brake system illustrating a proportional pressure control valve in detail.

FIG. 6 illustrates the brake system for automobiles of the embodiment, which is similar to that of the second embodiment as described above and illustrated in FIG. 4, except that the electromagnet valve 76 intervened in the passage, which communicates the master cylinder 2 and the proportional pressure control valve 80, is replaced with the relief valve 116 and the return valve 117 shown in FIG. 6. The replacement of the electromagnet valve 76 with the relief valve 116 and the return valve 117 causes the liquid pressure within the master cylinder 2 to be transmitted through the relief valve 116 to the auxiliary control portion 81 in the normal powered operation mode. In particular, until the pressure of the braking liquid within the master cylinder 2 overcomes the biasing force applied by a valve closing spring in the relief valve 116, the control device 70 adjusts the proportional pressure control valve 80 in response to the signal output from the liquid pressure sensor 13 in the same manner as the conventional control device does. Meanwhile, once the pressure of the braking liquid overcomes the biasing force applied by a valve closing spring, it is transmitted through the passage 75 to the auxiliary control portion 81, which in turn, presses down the auxiliary piston 84 so as to actuate the proportional pressure control valve 80. To this end, the applied pressure to the wheels is the pressure generated by the auxiliary control portion 81, in addition to the pressure controlled by the proportional pressure control valve 80 in response to the signal output from the liquid pressure sensor 13. Thus, the higher pressure can be applied to the wheels.

The release of the brake pedal 1 by the driver reduces the pressure of the braking liquid within the master cylinder 2 so as to close the relief valve 116. The upward movement of the auxiliary piston 84 returns the redundant braking liquid to the master cylinder 2 through the return valve 117.

One of the advantages of the vehicle brake system according to the embodiment is, as described above, to obtain the higher pressure by increasing the movement of the proportional pressure control valve 80 when the stroke of the brake pedal exceeds beyond the predetermined one in normal powered condition. Therefore, for example, even if a gain output in response to the stroke of the brake pedal from the stroke sensor or a gain output from the liquid pressure sensor is reduced because of any malfunctions, the higher pressure can be ensured for efficiently braking the wheels. Besides, even if the electric system fails, the proportional pressure control valve 80 can be operated. To this end, the braking force is increased in the powered condition, and also the safety is advantageously improved in emergency.

The embodiment of the present invention shown in FIG. 6 is applied to the brake system described above and illustrated in FIG. 4, by the replacement of the electromagnet valve 76 with the relief valve 116 and the return valve 117. However, it is not limited thereto, and it may also be applied to any types of the brake systems as illustrated in FIGS. 1 and 2 by the replacement of the electromagnet valve 76 with the relief valve 116 and the return valve 117.

FIGS. 7(a) and 7(b) are partial views of modifications of the embodiment, illustrating only the modified portions of the vehicle brake system. The other structure is similar to that shown in FIG. 6. In FIG. 7(a), the liquid pressure within the master cylinder 2, generated by the brake pedal operation, is transmitted to the proportional pressure control valve 110 through the relief valve 116 in a similar manner to that illustrated in FIG. 6. The proportional pressure control valve 110 has an inner bore, in which a plurality of springs 119 and another piston 121 are installed on an upper surface of the spool 52. The liquid pressure applied to the piston 121 presses down the piston 121 against the biasing force of the springs 119. According to this modification, the advantage similar to that of the embodiment described above is obtained, also in addition, advantageously, the spring 119 serves as a buffer.

In the proportional pressure control valve 110 shown in FIG. 7(b), the sleeve 51b has an enlarged bore portion, in which, in addition to the installation of the springs 119 and the piston 121 on the upper surface of the spool 52, other springs 122 are installed on a step defined by the enlarged bore portion. The piston 122 is upwardly biased by those springs. At the initial step when the brake pedal 1 is stepped to increase the pressure within the master cylinder 2, the increased pressure is balanced with the biasing force by the springs 122. However, after the increased pressure is beyond the predetermined pressure, the another springs 119 are also compressed downwardly so as to press down the spool 52. The proportional pressure control valve 110 so constructed eliminates the relief valve 116 and the return valve 117 to simplify the structure thereof. The operations in the powered and off-powered conditions bring similar advantages to those illustrated in FIG. 7(a).

Figure 8:
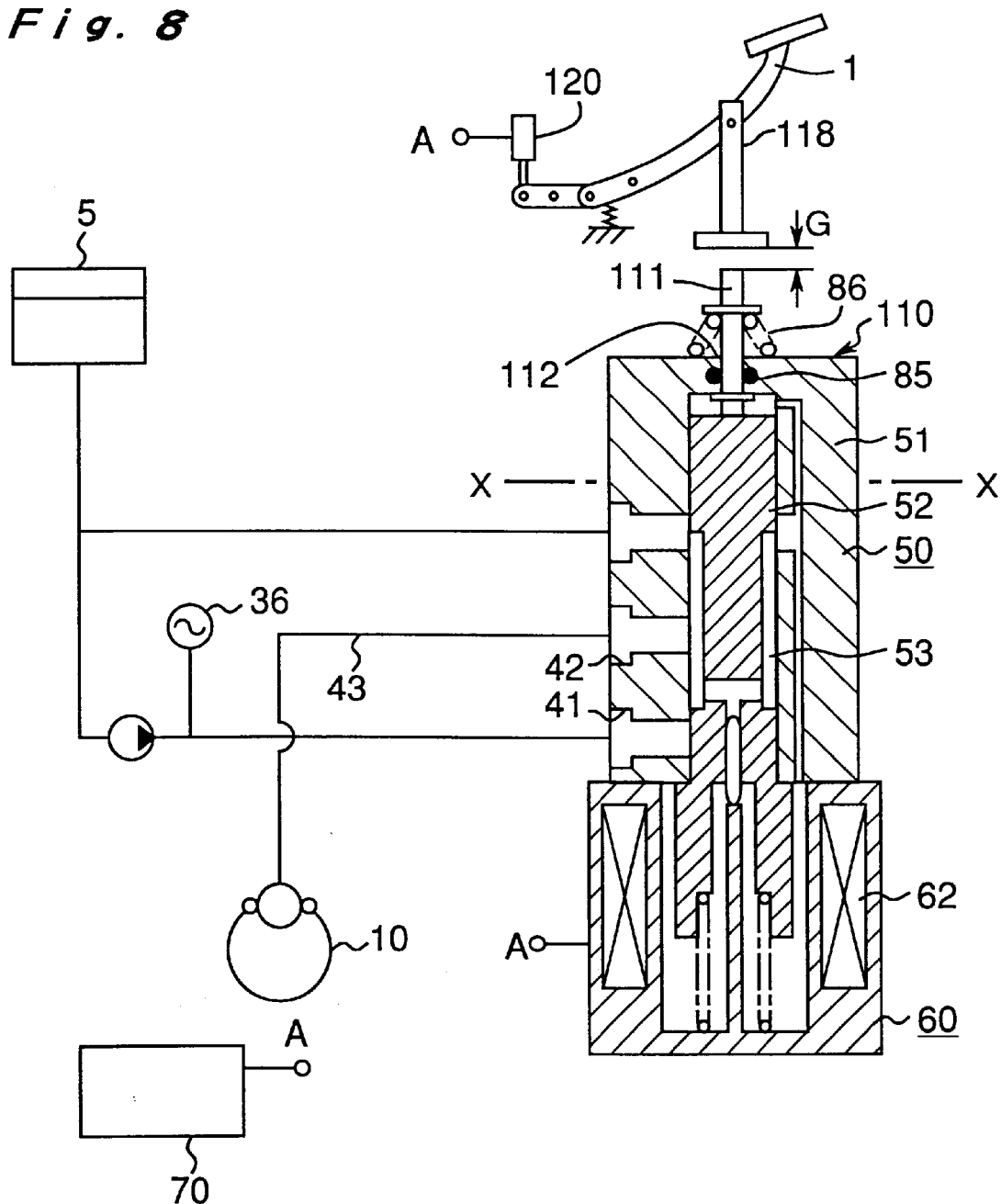
FIG. 8 is a partial schematic view of another preferred embodiment of the brake system illustrating a proportional pressure control valve in detail.

Next, with reference to the drawings, a fifth preferred embodiment of a brake system for automobiles according to the present invention will be described in detail. FIG. 8 illustrates a brake system for automobiles according to an embodiment, which generally includes the proportional pressure control valve 110 with the extension rod 111 that is described above and illustrated in FIG. 5, and the brake pedal 1 with a push rod 118 opposing to and spaced by a predetermined gap G away from the extension rod 111. Although the stroke sensor 120 is applied to the brake pedal 1, other sensors for detecting the stepping force may be installed thereto. Other structures are similar to those of the embodiment illustrated in FIG. 5.

In the operation of the vehicle brake system of the embodiment so constructed, once the driver steps the brake pedal 1, the stroke sensor 120 detects the stroke thereof and then outputs the signal in response to the stroke to the control device 70. The control device 70 activates the proportional pressure control valve 110 in accordance with the output signal so as to guide the pressurized braking liquid stored in the accumulator into the wheels. This operation is similar to that of the conventional brake system. According to the embodiment of the vehicle brake system, the stroke corresponding to the predetermined gap G causes the push rod 118 to contact with the extension rod 111, and the further stroke beyond the predetermined gap G presses down the extension rod 111. The downward press of the extension rod 111 also presses down the spool 52, and actuates the proportional pressure control valve 110 so that the input port 41 has a larger opening. Thus, since the proportional pressure control valve 110 is controlled both directly by the operation of the brake pedal 1 and by the signal output in response to the stroke from the stroke sensor 120, the more effective braking force can be obtained with use of the high pressure of the braking liquid stored in the accumulator 36.

Figure 12:
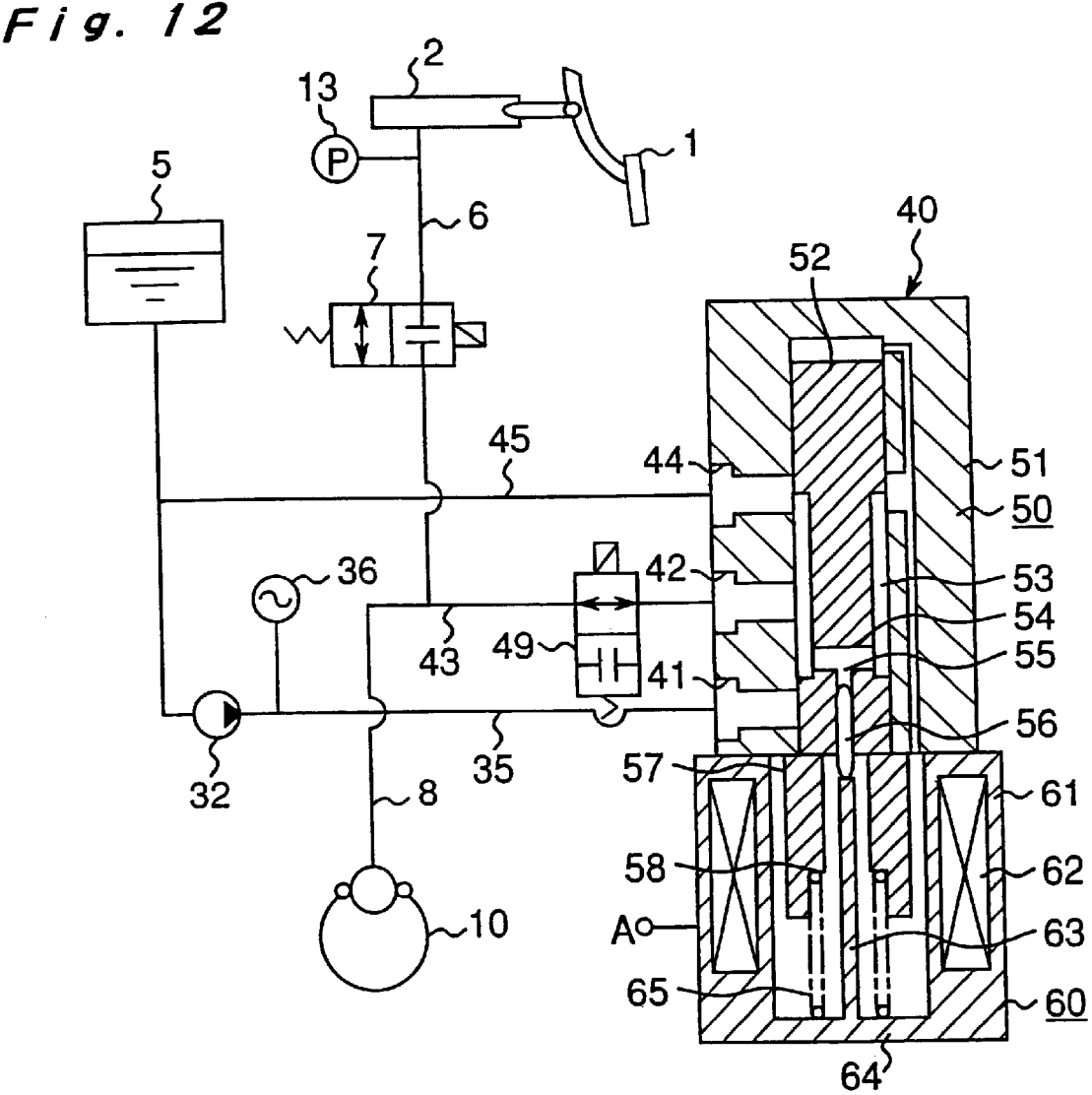
FIG. 12 is a partial schematic view of the brake system shown in FIG. 11.
Figure 13:
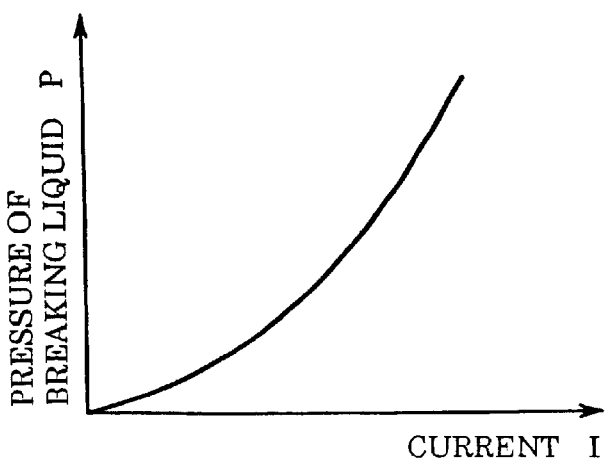
FIG. 13 is a graph illustrating a relationship between a current provided in a coil of the proportional pressure control valve and a pressure of a braking liquid.

Although the embodiment of the present invention illustrated in FIG. 8 is applied to the prior art brake system shown in FIG. 14, it is not limited thereto, and it may also be applied to any types of vehicle brake systems such as one shown in FIG. 12. Also, FIG. 8 shows the separate extension rod 111, however, the sleeve may have an extension portion extending through the hole, on which the push rod 118 presses downwardly. According to the embodiment, advantageously, the proportional pressure control valve 110 can be actuated in the off-powered condition, and the safety can be improved in emergency.

FIGS. 9(a) and 9(b) show various modifications of the embodiment, illustrating a portion above the imaginary line X—X in FIG. 8. Other structures not shown are similar to those in FIG. 8. In FIG. 9(a), the extension rod 111 is eliminated, and the push rod 118 of the brake pedal 1 is positioned so that it opposes to the spool 52 with the predetermined gap G therebetween. The operation of the modification is similar to that described above and illustrated in FIG. 8 except that the push rod 118 itself directly presses down the spool 52 after the brake pedal is stepped beyond the predetermined stroke. Also, an elastic member such as a spring may be intervened in the gap G in FIGS. 8 and 9(a). In this case, the operation of the brake pedal compresses the spring, which in turn, biases the spool 52 downwardly. As the spring is compressed, the biasing force to press the spool 52 down is increased, this advantageously causes the proportional pressure control valve 110 to be controlled in response to the stroke of the brake pedal stepped by the driver.

In FIG. 9(b), provided in the upper and inner portion of the sleeve 51a is a reduced bore portion defining a step. Also, a stop plate 115 and a spring 119 are positioned in contact with and between the step and the upper surface of he spool 52. The push rod 118a connected with the brake pedal 1 is biased upwardly by a return spring so that it defines the gap G to the stop plate 115. When the brake pedal 1 is stepped beyond the predetermined stroke, the push rod 118a contacts with the stop plate 15, and then compresses the spring so as to press the spool downwardly. Since the spring more compressed generates the stronger biasing force to press the spool 52 down, the modification in FIG. 9(b) has the advantage similar to that in FIG. 9(a). In addition to this, conveniently, the spring 119 serves as a buffer.

According to the modifications illustrated in FIGS. 9(a) and 9(b), the proportional pressure control valve 110 can be controlled not only by the control device 70 but also by the stroke of the brake pedal 1. It should be noted that the elastic member shown in FIG. 9(b) may be a rubber strip instead of spring 119.

In another modification of the embodiment, the embodiment of the present invention can be applied to the vehicle brake system described above and illustrated in FIG. 5 of the above-mentioned embodiment. In particular, although the electromagnetic clutch 113 holds or grasps the extension rod 111 in the off-powered condition such as in emergency, it may also be used in the powered condition to hold the extension rod 111 if the stroke sensor 120 detects the signal indicating that the brake pedal is stepped beyond the predetermined stroke. To this end, the proportional pressure control valve 110 is controlled only by the control device 70 while the stroke of the brake pedal is within the threshold value, however when it exceeds the predetermined value, the electromagnetic clutch 113 is actuated to allow the brake pedal operation to directly control the proportional pressure control valve 110. The advantages of the modification is similar to that described above for the embodiment.

Figure 10:
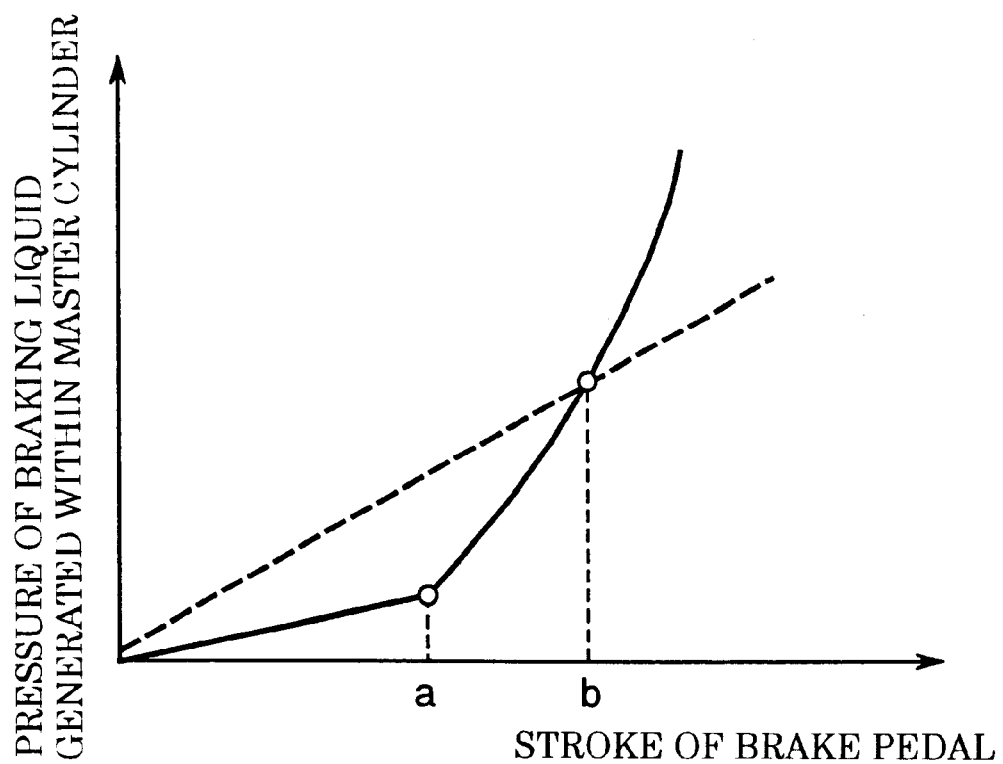
FIG. 10 is a graph illustrating a relationship between a stroke of a brake pedal and a pressure of a braking liquid.

Next, with reference to the drawings, a sixth preferred embodiment of a brake system for automobiles according to the present invention will be described in detail. FIG. 10 is a graph illustrating the relationship between a stroke of the brake pedal stepped by the driver and the pressure of the braking liquid generated within the master cylinder 2. When the driver steps the brake pedal, the piston within the master cylinder moves and then the braking liquid therein is pressurized. However, in particular, when a drum brake is utilized for braking the wheels, the pressurized braking liquid has to move a wheel cylinder piston provided with the wheel to some distance so that the braking liquid pressure is not increased so much. Also, when a disk brake is utilized, while the pressurized braking liquid moves a pad of a caliper, the braking liquid pressure is not increased so much. Thus, once the pad actually contacts with the brake disk or drum, the braking liquid pressure serves as a force pressing the drum or disk, and then increases remarkably. This is because the braking liquid itself can not be constricted, and the passage, the cylinder, and the flexible hose hardly expand due to the braking liquid pressure, and also the brake pedal arm is little bent when stepped by the driver. To this end, as illustrated in FIG. 10, there is the relationship between the stroke of the brake pedal and the braking liquid pressure, in which the slope of the braking liquid pressure is gentle up to the stroke point a, and is steep thereafter.

In the conventional brake system, once the control device 70 receives an input signal representative of the pressure of the braking liquid within the master cylinder as shown by the real line in FIG. 10, it controls the current applied to the coil 62 of the control portion 60 that is proportional to the liquid braking pressure. Contrary, according to the embodiment, the input signal representative of the stroke instead of the pressure is applied to the control device 70, which, in turn, supplies the current to the coil 62 corresponding to the input signal so that more appropriate braking force can be obtained in response to the pedal stroke stepped by the driver.

Therefore, in the embodiment of the present invention, the control portion controlling the proportional pressure control valve 80 receives the input signal representative of the stroke, rather than the braking liquid pressure within the master cylinder used in the foregoing embodiments illustrated in FIGS. 2 through 9. This can be realized by providing a stroke sensor 120 with the brake pedal 1 as shown in FIG. 1, which detects the stepped stroke of the brake pedal 1 to output the signal as indicated by the dashed line in FIG. 10 to the control device 70.

Also, referring to FIG. 10, the braking liquid pressure in response to the linear output signal based upon the stepped stroke has the same pressure as that within the master cylinder at the stroke point b, and the latter is higher than the former beyond the stroke point b. In other words, once the braking liquid begins to press the braking drum or disk so as to brake the wheel, a small increment of the stroke significantly increases the pressure of the braking liquid. Meanwhile, for example when required to halt the wheel in emergency, advantageously, the braking liquid pressure may be much higher than that corresponding to the output signal shown by the dashed line. In order to incorporate the advantage with the embodiment, the control device 70 receives the input signal such that the braking liquid pressure linearly increases up to or adjacent to the stroke point b, and increases corresponding to the pressure of the braking liquid within the master cylinder beyond the stroke point b.

Therefore, according to the embodiment, the control device 70 outputs the instruction regarding to the current supplied to the coil 62 in the valve control portion 60 of the proportional pressure control valve 80 such that the instruction is defined based upon the combination of the stroke of the brake pedal 1 and the braking liquid pressure, thus for achieving the more appropriate braking force. In order to realize this, input to the control device 70 is the signal indicating the stroke detected by the sensor 120 shown in FIG. 1 or the pressure of the braking liquid sensed within the master cylinder 2, and the control device 70 is provided with a logic circuit for selectively switching the signal corresponding to the stroke or the braking liquid pressure.

Although no description is made for other brake systems such as the ABS and the traction control, this invention results in no adverse impact to those systems, on the contrary, it can be utilized in cooperation therewith.

According to the vehicle brake system of the present invention, the pressurized braking liquid stored in the auxiliary pressure source can be exploited even when the electric system fails in emergency as well as in normal powered condition without any undue load for the driver so as to ensure the sufficient braking force to be applied to the wheels even in the off-powered condition.

Also, according to the present invention, the addition of the simple feature to the braking system itself incapable of braking the wheels in the off-powered condition allows the pressurized braking liquid stored in the auxiliary pressure source to be exploited even when the electric system fails in emergency as well as in normal powered condition without any undue load for the driver so as to ensure the sufficient braking force to be applied to the wheels even in the off-powered condition.

Further, according to the present invention, the more effective braking force can be obtained by increasing the movement of the proportional pressure control valve in a condition where the brake pedal is stepped beyond the predetermined stroke in the normal powered condition. In addition, even in the off-powered condition such as in emergency, the proportional pressure control valve can be controlled so that the safety of the brake system can advantageously be improved in emergency.

Even further, according to the present invention, the brake system used for the automobiles can be controlled both by the braking liquid pressure and by the stroke of the brake pedal so that the more appropriate braking force can be ensured in accordance with the brake pedal operation.

What is claimed is:

1. A brake device for use with automobiles, the brake device comprising:

a stroke sensor that detects a stroke of a brake pedal;

a reservoir that stores a braking liquid;

an auxiliary pressure source that pressurizes the brake liquid within said reservoir and accumulates the pressurized braking liquid;

a controller that calculates a braking liquid pressure required for braking wheels, based upon information output from said stroke sensor;

a proportional pressure control valve that adjusts the pressurized braking liquid supplied from said auxiliary pressure source in accordance with an electric signal output from said controller; and an auxiliary control mechanism including a moving portion engaging with the brake pedal, the moving portion directly actuating said proportional pressure control valve in accordance with the stroke, if the brake pedal is stepped beyond a predetermined stroke, said auxiliary control mechanism also including an extension rod extending from a spool that switches said proportional pressure control valve, and an electromagnetic clutch installed with said extension rod, wherein upon receiving a signal indicating that the brake pedal is stepped beyond a predetermined stroke, said electromagnet clutch holds said extension rod so as to press said spool through said extension rod.

2. The brake device according to claim 1, wherein one of said spool and said extension rod is partially made of an elastic material.

3. The brake device according to claim 2, wherein the elastic material is a spring.

4. A brake device for use with automobiles, the brake device comprising:

a stroke sensor that detects a stroke of a brake pedal;

a reservoir that stores a braking liquid;

an auxiliary pressure source that pressurizes the brake liquid within said reservoir and accumulates the pressurized braking liquid;

a controller that calculating a braking liquid pressure required for braking wheels, based upon information output from said stroke sensor;

a proportional pressure control valve that adjusts the pressurized braking liquid supplied from said auxiliary pressure source in accordance with an electric signal output from said controller; and an auxiliary control mechanism including a moving portion engaging with the brake pedal, the moving portion directly actuating said proportional pressure control valve in accordance with the stroke, while electrically disconnected from a power source, said auxiliary control mechanism also including an extension rod extending from a spool that switches said proportional pressure control valve, and an electromagnetic clutch installed with said extension rod, wherein said electromagnet clutch holds said extension rod so as to press said spool through said extension rod, while electrically disconnected from the power source.

5. The brake device according to claim 4, wherein one of said spool and said extension rod is partially made of an elastic material.

6. The brake device according to claim 5, wherein the elastic material is a spring.

7. A braking system comprising:

a brake pedal;

a stroke sensor that outputs a stroke signal in response to a stroke of the brake pedal;

an accumulator that accumulates a pressurized braking liquid;

a proportional pressure controller that controls the pressure of the pressurized braking liquid, and supplies the pressurized braking liquid to a wheel;

an extension rod connected to the proportional pressure controller; and an electromagnetic clutch that holds the extension rod during an off-powered condition so as to move the extension rod in response to the stroke of the brake pedal, and releases the extension rod during an on-powered condition;

wherein the proportional pressure controller controls the pressure of the pressurized braking liquid in accordance with the stroke signal during the on-powered condition and in accordance with the motion of the extension rod during the off-powered condition.

8. The braking system according to claim 7, wherein the extension rod is partially made of an elastic material.

9. The braking system according to claim 8, wherein the elastic material is a spring.

* * * * *

UNITED STATES PATENT AND TRADEMARK OFFICE
CERTIFICATE OF CORRECTION

| | |
|---|---|
| PATENT NO. | : 6,685,280 B1 |
| APPLICATION NO. | : 09/868633 |
| DATED | : February 3, 2004 |
| INVENTOR(S) | : M. Yoshino et al. |

It is certified that error appears in the above-identified patent and that said Letters Patent is hereby corrected as shown below:

On the Title Page of the printed patent, at Item (57), Abstract, line 19, "cane be replaces" should be --can be replaced --.

Signed and Sealed this

Seventh Day of November, 2006

JON W. DUDAS
*Director of the United States Patent and Trademark Office*